US008958428B2

(12) United States Patent
Patel et al.

(10) Patent No.: US 8,958,428 B2
(45) Date of Patent: Feb. 17, 2015

(54) METHOD AND SYSTEM FOR CONFIGURING WIRELESS ROUTERS AND NETWORKS

(75) Inventors: Pulin R. Patel, McKinney, TX (US);
Ojas T. Choksi, Plano, TX (US);
Kenneth W. Davidson, Plano, TX (US);
Ramanamurthy Dantu, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 437 days.

(21) Appl. No.: 12/908,373

(22) Filed: Oct. 20, 2010

(65) Prior Publication Data

US 2011/0032844 A1 Feb. 10, 2011

Related U.S. Application Data

(63) Continuation of application No. 11/345,865, filed on Feb. 2, 2006, now Pat. No. 7,826,463, which is a continuation of application No. 09/513,090, filed on Feb. 25, 2000, now Pat. No. 7,031,266.

(51) Int. Cl.
| | |
|---|---|
| *H04W 28/18* | (2009.01) |
| *H04W 88/14* | (2009.01) |
| *H04L 12/751* | (2013.01) |
| *H04W 8/22* | (2009.01) |
| *H04W 8/24* | (2009.01) |
| *H04W 76/02* | (2009.01) |
| *H04W 52/02* | (2009.01) |

(52) U.S. Cl.
CPC ............ *H04W 88/14* (2013.01); *H04L 45/02* (2013.01); *H04W 8/22* (2013.01); *H04W 8/245* (2013.01); *H04W 28/18* (2013.01); *H04W 76/02* (2013.01); *H04W 52/0235* (2013.01)
USPC ......................................... 370/401; 709/220

(58) Field of Classification Search
None
See application file for complete search history.

(56) References Cited

U.S. PATENT DOCUMENTS

| | | | |
|---|---|---|---|
| 5,257,283 A | 10/1993 | Gilhousen et al. | 375/1 |
| 5,293,640 A | 3/1994 | Gunmar et al. | 455/33.1 |
| 5,301,359 A | 4/1994 | Van den Heuvel et al. | 455/56.1 |
| 5,305,466 A | 4/1994 | Taketsugu | 455/435.1 |
| 5,561,839 A | 10/1996 | Osterberg et al. | 455/33.1 |
| 5,603,085 A | 2/1997 | Shedlo | 455/33.1 |
| 5,666,356 A | 9/1997 | Fleming et al. | 370/328 |
| 5,715,245 A | 2/1998 | Suonvieri | 370/337 |

(Continued)

FOREIGN PATENT DOCUMENTS

| | | | | |
|---|---|---|---|---|
| EP | 0 831 669 A2 | 3/1998 | | H04Q 7/38 |
| EP | 0 841 763 A1 | 5/1998 | | H04B 7/26 |

(Continued)

OTHER PUBLICATIONS

*Data Networks*, Bertsekas et al., 1987.

(Continued)

*Primary Examiner* — Duc Duong
(74) *Attorney, Agent, or Firm* — Baker Botts L.L.P.

(57) ABSTRACT

A method and system for configuring a wireless router and a wireless communications network includes establishing connectivity between a wireless router and at least one wireline router. Connectivity between the wireless router and a plurality of neighboring wireless routers is established through the wireline router. The wireless router is configured based on information exchanged with the neighboring wireless routers through the wireline router.

24 Claims, 15 Drawing Sheets

(56) References Cited

U.S. PATENT DOCUMENTS

| | | | | |
|---|---|---|---|---|
| 5,717,688 | A | 2/1998 | Belanger et al. | 370/331 |
| 5,719,860 | A | 2/1998 | Maison et al. | 370/347 |
| 5,734,967 | A | 3/1998 | Kotzin et al. | 455/63 |
| 5,737,328 | A | 4/1998 | Norman et al. | 370/331 |
| 5,745,480 | A | 4/1998 | Behtash et al. | 370/252 |
| 5,768,260 | A | 6/1998 | Lindgren et al. | 370/252 |
| 5,781,536 | A | 7/1998 | Ahmadi et al. | 370/252 |
| 5,805,585 | A | 9/1998 | Javitt et al. | 370/342 |
| 5,812,531 | A | 9/1998 | Cheung et al. | 370/255 |
| 5,812,950 | A | 9/1998 | Tom | 455/440 |
| 5,822,361 | A | 10/1998 | Nakamura et al. | 375/133 |
| 5,839,070 | A | 11/1998 | Lupien et al. | 455/440 |
| 5,862,485 | A | 1/1999 | Linneweh, Jr. et al. | 455/450 |
| 5,918,016 | A | 6/1999 | Brewer et al. | 709/220 |
| 5,923,650 | A | 7/1999 | Chen et al. | 370/331 |
| 5,949,760 | A | 9/1999 | Stevens et al. | 370/254 |
| 5,987,326 | A | 11/1999 | Tiedemann, Jr. et al. | 455/442 |
| 5,995,805 | A | 11/1999 | Ogasawara et al. | 455/13.1 |
| 6,021,309 | A | 2/2000 | Sherman et al. | 455/12.1 |
| 6,070,084 | A | 5/2000 | Hamabe | 455/522 |
| 6,094,579 | A | 7/2000 | Olvera-Hernandez et al. | 455/437 |
| 6,108,549 | A | 8/2000 | Bonta | 455/446 |
| 6,111,857 | A * | 8/2000 | Soliman et al. | 370/254 |
| 6,128,490 | A | 10/2000 | Shaheen et al. | 455/434 |
| 6,134,230 | A | 10/2000 | Olofsson et al. | 370/337 |
| 6,151,309 | A | 11/2000 | Busuioc et al. | 370/329 |
| 6,157,668 | A | 12/2000 | Gilhousen et al. | 375/130 |
| 6,181,738 | B1 | 1/2001 | Chheda et al. | 375/224 |
| 6,185,421 | B1 | 2/2001 | Alperovich et al. | 455/433 |
| 6,226,283 | B1 | 5/2001 | Neumiller et al. | 370/340 |
| 6,236,365 | B1 | 5/2001 | LeBlanc et al. | 342/457 |
| 6,256,300 | B1 | 7/2001 | Ahmed et al. | 370/331 |
| 6,259,918 | B1 | 7/2001 | Labonte et al. | 455/437 |
| 6,285,880 | B1 | 9/2001 | Gagnon et al. | 455/432.1 |
| 6,289,005 | B1 | 9/2001 | Katz | 370/328 |
| 6,304,562 | B1 | 10/2001 | Kim et al. | 370/332 |
| 6,324,185 | B1 | 11/2001 | Budhraja | 370/468 |
| 6,327,254 | B1 | 12/2001 | Chuah | 370/328 |
| 6,347,224 | B1 | 2/2002 | Smyth et al. | 455/406 |
| 6,349,200 | B1 | 2/2002 | Sabat et al. | 455/403 |
| 6,360,271 | B1 | 3/2002 | Schuster et al. | 709/231 |
| 6,405,048 | B1 | 6/2002 | Haartsen | 455/464 |
| 6,411,810 | B1 | 6/2002 | Maxemchuk | 455/453 |
| 6,414,955 | B1 | 7/2002 | Clare et al. | 370/390 |
| 6,421,731 | B1 | 7/2002 | Ciotti et al. | 709/238 |
| 6,434,132 | B1 | 8/2002 | Ishii et al. | 370/338 |
| 6,434,134 | B1 | 8/2002 | La Porta | 370/338 |
| 6,456,599 | B1 | 9/2002 | Elliott | 370/254 |
| 6,496,505 | B2 | 12/2002 | LaPorta et al. | 370/392 |
| 6,574,473 | B2 | 6/2003 | Rinne et al. | 455/436 |
| 6,587,457 | B1 | 7/2003 | Mikkonen | 370/356 |
| 6,606,303 | B1 * | 8/2003 | Hassel et al. | 370/238 |
| 6,620,014 | B1 * | 9/2003 | Lindgren | 455/446 |
| 6,654,384 | B1 | 11/2003 | Reza et al. | 370/469 |
| 6,678,252 | B1 * | 1/2004 | Cansever | 370/253 |
| 6,954,616 | B2 | 10/2005 | Liang et al. | 455/63.1 |
| 6,970,434 | B1 | 11/2005 | Mahany et al. | 370/256 |
| 7,159,035 | B2 | 1/2007 | Garcia-Luna-Aceves et al. | 709/241 |
| 7,826,463 | B2 * | 11/2010 | Patel et al. | 370/401 |
| 2001/0025321 | A1 | 9/2001 | Tang et al. | 709/246 |
| 2002/0032800 | A1 | 3/2002 | Puuskari et al. | 709/246 |
| 2003/0067906 | A1 * | 4/2003 | Young | 370/347 |
| 2005/0089011 | A1 * | 4/2005 | Bender | 370/349 |
| 2005/0157691 | A1 * | 7/2005 | Stewart et al. | 370/338 |

FOREIGN PATENT DOCUMENTS

| | | | |
|---|---|---|---|
| EP | 1 041 850 A1 | 10/2000 | H04Q 7/38 |
| WO | WO 98/45966 | 10/1998 | H04B 7/24 |
| WO | WO 98/52288 | 11/1998 | H04B 1/00 |
| WO | WO 99/53630 | 10/1999 | H04B 7/005 |

OTHER PUBLICATIONS

"On the Capacity of a Cellular CDMA System," Gilhousen et al., *IEEE* 1991, 10 pages, 1991.

"Erlang Capacity of a Power Controlled CDMA System," Viterbi et al., *IEEE* 1993, 9 pages, 1993.

B. Bakshi, et al., "Improving Performance of TCP over Wireless Networks," IEEE 17th International Conference on Distributed Computing Systems, 10 pages, May 1997.

Timothy Ju and Gary Ogasawara, "Congestion Control by Traffic Shaping for Ground//Satellite Network," XP-002140800, Milcom '97 Proceedings, Nov. 2-5, 1997, 5 pages, Nov. 2-May 1997.

U.S. Appl. No. 09/174,273, entitled "Method and Apparatus for Class Based Transmission Control of Data Connections Based on Real-Time External Feedback Estimates Obtained Using Messaging from a Wireless Network," filed Oct. 16, 1998, 35 pages, Oct. 18, 1998.

S. Biaz and N. Vaidya, "Discriminating Congestion Losses from Wireless Losses using Inter-Arrival Times at the Receiver," IEEE Symposium Application-Specific Systems and Software Engineering Technology (ASSET), 8 pages, Mar. 1999.

G. Holland and N.H. Vaidya, "Analysis of TCP Performance over Mobile Ad Hoc Networks," Fifth Annual ACM/IEEE International Conference on Mobile Computing and Networking (MOBICOM), 13 pages, Aug. 1999.

G. Holland and N.H. Vaidya, "Impact of Routing and Link Layers on TCP Performance in Mobile Ad Hoc Networks," IEEE Wireless Communications and Networking Conference (WCNC), 5 pages, Oct. 1999.

U.S. Appl. No. 09/466,308, entitled "Method and System for Allocating Bandwidth in a Wireless Communications Network," filed Dec. 17, 1999, 85 pages, Dec. 17, 1999.

U.S. Appl. No. 09/513,914, entitled "Wireless Router and Method for Processing Traffic in a Wireless Communications Network," filed Feb. 25, 2000, 87 pages, Feb. 25, 2000.

U.S. Appl. No. 09/513,913, entitled "Method and System for Managing Transmission Resources in a Wireless Communications Network" filed Feb. 25, 2000, 73 pages, Feb. 25, 2000.

U.S. Appl. No. 09/513,592, entitled "Method and System for Brokering Bandwidth in a Wireless Communications Network," filed Feb. 25, 2000, 50 pages, Feb. 25, 2000.

U.S. Appl. No. 09/513,912, entitled "Method and System for Queuing Traffic in a Wireless Communications Network," filed Feb. 25, 2000, 94 pages, Feb. 25, 2000.

CA*net II Differentiated Services. Bandwidth Broker System Specification, British Columbia Institute of Technology, Technology Centre, Group for Advanced Information Technology, http://www.interrnet2.edu/qos/gbone/QB BAC.shtml, Online Oct. 4, 1998, XP-002136418, 13 pages, Printed Apr. 25, 2000.

Haas et al. "On the Performance of a Routing Protocol for the Reconfigurable Wireless Networks". IEEE. May 18, 1998-May 21, 1998. pp. 102-106.

Corson et al. "Internet-based mobile ad hoc networking". IEEE. Aug. 1999. pp. 63-70.

U.S. Appl. No. 09/591,077, entitled "Method and System for Dynamic Soft Handoff Resource Allocation in a Wireless Network," filed Jun. 9, 2000, 66 pages, Jun. 9, 2000.

U.S. Appl. No. 09/908,225, entitled "Method and System of Integrated Rate Control for a Traffic Flow Across Wireline and Wireless Networks," filed Jul. 18, 2001, 32 pages, Jul. 18, 2001.

"TCP and Explicit Congestion Notification," Floyd, Lawrence Berkeley Laboratory, DE-AC03-76SF00098, 16 pages.

Schoen, et al., "*Convergence Between Public Switching and the Internet*", IEEE Communications Magazine, vol. 36, Issue 1, ISSN: 0163-6804, pp. 50-65, 2 pages from IEEE Xplore™, Jan. 1998.

Perkins, Charlie, "*Mobile IP and Security Issue: An Overview*", Internet Technologies and Services, 1999, Proceedings First IEEE/Popov Workshop on, IEEE Catalog No. 99EX391, pp. 131-148, 2 pages from IEEE Xplore™, 1999.

Cohen et al. "IP Addressing and Routing in a Local Wireless Network". IEEE INFOCOM '92 May 4, 1992-May 8, 1992. pp. 626-632.

Pearlman et al. "Determining the Optimal configuration for the Zone Routing protocol". IEEE. Aug. 1999, pp. 1395-1414.

* cited by examiner

FIG. 3

| GEO PARAMETERS 60 | NETWORK CONFIGURATION PARAMETERS 62 | SERVICE CONFIGURATION 64 | ANTENNA PARAMETER PER SECTOR/BEAM 66 |
|---|---|---|---|
| SITE ID<br>NO. OF SECTOR/BEAMS<br>SECTOR/BEAM ID<br>LATITUDE AND LONGITUDE<br>SECTOR/BEAM ORIENTATION<br>MAXIMUM RADIUS OF INFLUENCE | INTERFACE TO NETWORK<br>eg: T1, SONET, T3 FRACTIONAL T1 ETC<br>SITE CAPACITY<br>NETWORK CAPACITY | DA ADDRESS<br>LIST OF SERVICES SUPPORTED | ANTENNA TYPE<br>DIGITIZED ANTENNA PATTERN<br>ANTENNA BEAM WIDTH<br>├─ HORIZONTAL<br>└─ VERTICAL<br>ANTENNA MAX GAIN<br>ANTENNA DOWNTILT<br>├─ MECHANICAL<br>└─ ELECTRICAL |

50

52

| THRESHOLD PARAMETERS 80 | COVERAGE PARAMETERS 70 | SPECTRUM PARAMETERS 72 | CHANNEL PARAMETERS 74 | INTERFERENCES PARAMETERS 76 | CONTROL PARAMETERS 78 | TRAFFIC ENGINEERING PARAMETERS 82 |
|---|---|---|---|---|---|---|
| % CALL BLOCKS<br>% FAILURE<br>% DROPS<br>% MAX DELAY<br>% FER<br>MAX RTT | ENVIRONMENT<br>PATH LOSS MARGIN<br>TYPE AND PERCENTAGE TRAFFIC<br>LOSSES: CABLE HARDWARE<br>COVERAGE THRESHOLD<br>PROPAGATION MODEL<br>TRAFFIC DISTRIBUTION MAP<br>RF COVERAGE PREDICTION MODEL | CHANNEL BW<br>CHANNEL MASK<br>CHANNEL NUMBER RANGE<br>MAX TRANSMIT POWER PER CHANNEL TECHNOLOGY | NUMBER OF CHANNELS AND THEIR RANGE<br>AIR CAPACITY<br>MIN CHANNEL SPACING<br>FREQUENCY REUSE<br>FREQUENCY GROUPING (SWITCH TABLE)<br>HOPPING SEQUENCES | INTERFERENCE THRESHOLD<br>POWER CONTROL THRESHOLDS<br>CHANNELIZATION AND SEQUENCING<br>CHANNEL SCHEDULE ALGORITHM<br>PROPAGATION MODEL<br>TRAFFIC DISTRIBUTION<br>ADJACENT CHANNEL INTERFACE THRESHOLD<br>RF INTERFERENCE PREDICTION MODEL | ACCESS PARAMETERS<br>INTRA-TECHNOLOGY HANDOFF PARAMETERS<br>INTER-TECHNOLOGY HANDOFF PARAMETERS<br>TIMING PARAMETERS | CLASS OF SERVICE<br>CONGESTION CONTROL ALGORITHM/PARAMETERS<br>QUEUING ALGORITHM/PARAMETERS<br>MIN AND MAX RESOURCE ALLOCATION FOR CLASSES OF SERVICE |

METHOD AND SYSTEM FOR CONFIGURING WIRELESS ROUTERS AND NETWORKS

RELATED APPLICATIONS

This application is a continuation of U.S. application Ser. No. 11/345,865 filed Feb. 2, 2006 and entitled "Method and System for Configuring Wireless Routers and Networks" which is a continuation of U.S. patent application Ser. No. 09/513,090 filed Feb. 25, 2000 and entitled "Method and System for Configuring Wireless Routers and Networks", now U.S. Pat. No. 7,031,266.

This application is related to U.S. patent application Ser. No. 09/513,912 entitled "Method and System for Queuing Traffic in a Wireless Communications Network," U.S. patent application Ser. No. 09/513,913 entitled "Method and System for Managing Transmission Resources in a Wireless Communications Network," U.S. patent application Ser. No. 09/513,592 entitled "Method and System for Brokering Bandwidth in a Wireless Communications Network," and U.S. patent application Ser. No. 09/513,914 entitled "Wireless Router and Method for Processing Traffic in a Wireless Communications Network," all filed on Feb. 25, 2000 and incorporated herein by reference.

TECHNICAL FIELD OF THE INVENTION

The present invention relates generally to the field of wireless communications, and more particularly to a method and system for configuring wireless routers and networks.

BACKGROUND OF THE INVENTION

Wireline Internet protocol (IP) provide efficient connectivity between remote devices. IP networks are implemented with routers that interconnect physically and logically separate network segments. In operation, the routers distinguish data packets according to network protocols and forwards traffic according to network-level addresses utilizing information that the routers exchange among themselves to find the best path between network segments. As the status of routers change in the network, the routers exchange information to reroute traffic around congested or failed routers or to route traffic to a newly activated router.

Cellular and other wireless networks have been connected to IP networks in order to allow cellular phones and other mobile devices to communicate with remote devices over the IP network. A typical cellular network covers a contiguous area that is broken down into a series of cells. Each cell has a base station and may be subdivided into sectors.

The base station communicates with mobile devices and is managed along with other base stations by a base station controller. A mobile switching center switches all traffic in the cellular network. A data interworking function provides connectivity from the mobile switching center to the Internet or other data network via circuit switched and packet switched data protocols. The centralized architecture of conventional cellular networks facilitates configuration of the wireless devices which are directly interconnected in a known topology, but requires all traffic to be sent to common switching points that may become overloaded during peak traffic times and cause traffic to be delayed and/or dropped.

By using routers, the intelligence of the cellular network can be distributed to allow efficient processing of traffic and communication over the IP network. Such routers, however, must be individually configured with knowledge of the wireless topography in which they operate to allow soft handoffs as mobile phones and other devices move between the coverage cells. This customization and independent configuration of each router is time consuming and expensive. In addition, as routers are activated and deactivated, neighboring routers must each be reconfigured to adjust for the changing RF topology.

SUMMARY OF THE INVENTION

The present invention provides a method and system for configuring wireless routers and other nodes and networks that substantially eliminate or reduce problems and disadvantages associated with previous methods and systems. In particular, the wireless network is implemented by wireless routers and/or nodes that automatically identify and negotiate parameters with neighboring wireless routers to configure themselves upon activation and to account for changing conditions in the wireless network.

In accordance with one embodiment of the present invention, a method and system for configuring a wireless node in a wireless communications network includes establishing connectivity between a wireless node and at least one wireline node. Connectivity between the wireless node and a plurality of neighboring wireless nodes is established through the wireline node. The wireless node is configured based on information exchanged with the neighboring wireless nodes through the wireline node.

More specifically, in accordance with a particular embodiment of the present invention, site impacting information is exchanged between the node and the neighboring wireless nodes. In this embodiment, the wireless node is configured based on the site impact information from the neighboring wireless nodes. One or more of the neighboring wireless nodes may also be reconfigured based on site impact information received from the wireless node.

In accordance with another aspect of the present invention, a method and system for operating a wireless node includes activating the wireless node in a start up state. A plurality of operating parameters are automatically determined for the wireless node in the start up state. The wireless node is configured based on the operating parameters. A radio frequency system for the wireless node is activated and the wireless node transitions to a learning state. In the learning state, operational data is collected and the operating parameters modified based on the operational data. The wireless node is reconfigured based on the modified operating parameters and transitions to a normal operating state in response to determining the operational data is within predefined parameters.

In accordance with other aspects of the present invention, the wireless node may negotiate operating parameters with the neighboring wireless nodes. Label switch or other suitable paths may be established between the wireless node and each of the neighboring wireless nodes. In addition, the wireless node may determine available services using the wireline and wireless connectivity.

Technical advantages of the present invention include providing an improved wireless network. In particular, the wireless network is implemented in a distributed architecture by wireless routers or other suitable wireless nodes that form part of the IP network. As a result, transmission resources are efficiently used and common switching points that can lead to delayed and/or dropped traffic are reduced or eliminated.

Another technical advantage of the present invention includes providing an automatically configurable wireless node. In particular, the wireless node automatically configures itself to both wireline and wireless transmission topologies upon activation and reconfigures itself to adapt to changing conditions within the system. As a result, the wireless nodes need not be independently configured or customized and thus may be readily deployed in any suitable wireless environment.

Still another technical advantage of the present invention includes providing an improved base station for a wireless network. In particular, the base station is implemented as a wireless router. This maximizes flexibility of the wireless network and allows new technologies to be readily deployed within the suitable wireless environment.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description, taken in conjunction with accompanying drawings, in which:

FIG. 3 is a block diagram illustrating details of the technology independent and specific site parameters of FIG. 2 in accordance with one embodiment of the present invention;

DETAILED DESCRIPTION OF THE INVENTION

Figure 1:
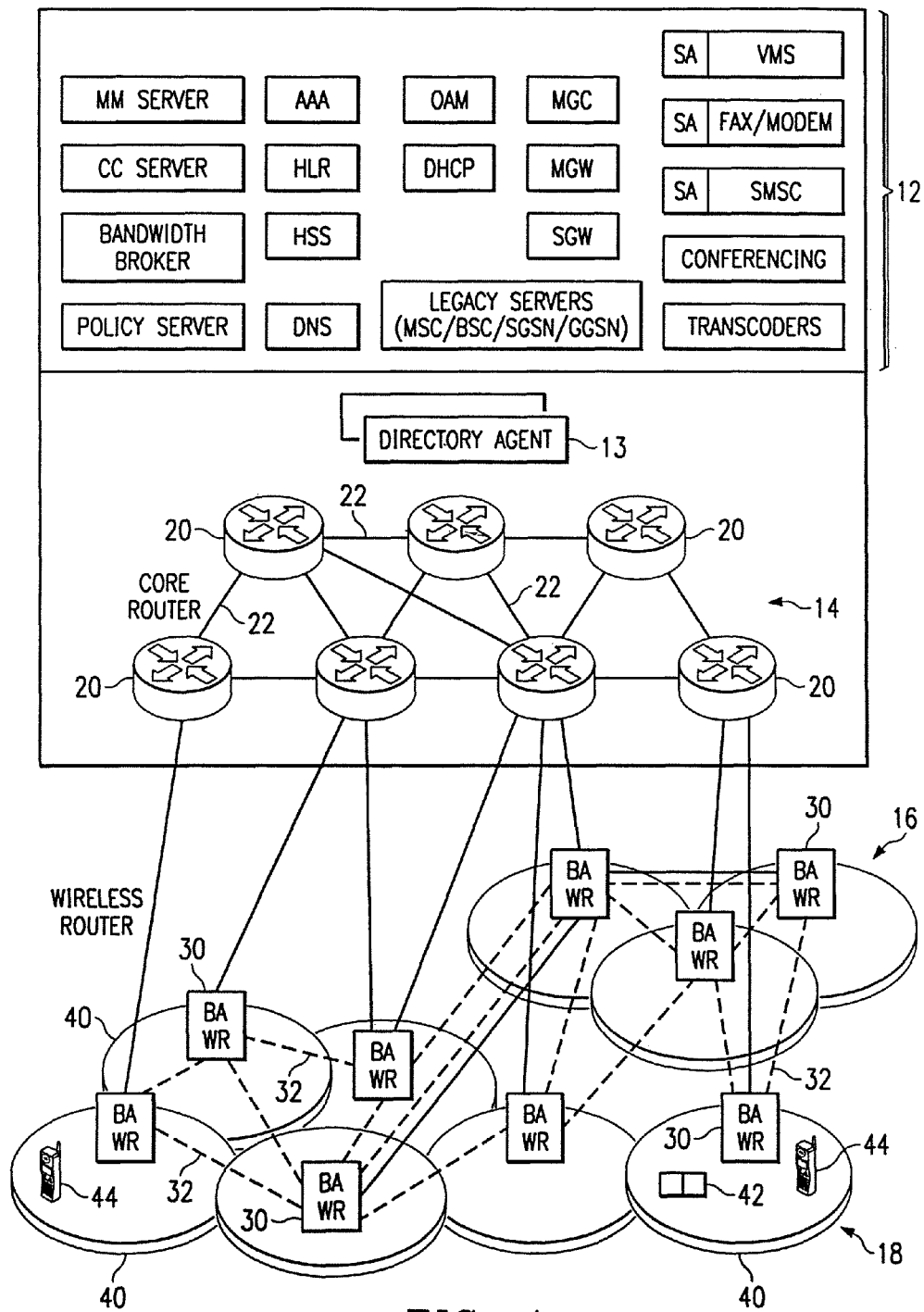
FIG. 1 is a block diagram illustrating layers of a all Internet protocol (IP) wireless communications network in accordance with one embodiment of the present invention.

FIG. 1 illustrates a wireless communications network 10 in accordance with one embodiment of the present invention. In this embodiment, the wireless network 10 is a multiple layer cellular network in which terrestrial wireless transmission originates in geographically delimited cells. It will be understood that the present invention may be used in connection with other suitable wireless networks.

Referring to FIG. 1, the wireless network 10 includes a service and/or control layer 12, a wireline router layer 14, a wireless node, or router layer 16, and a physical layer 18. The service layer 12 provides network services such as mobility manager (MM) server, call control (CC) server, bandwidth broker, policy server, home location register (HLR), home subscriber server (HSS), domain name server (DNS), dynamic host configuration protocol (DHCP), media gateway (MGW), signaling gateway (SGW), media gateway controller (MGC), authentication, authorization, and accounting (AAA), legacy servers for mobile switching center (MSC) and base station controller (BSC), serving GPRS serving node (SGSN), and gateway GPRS support node (GGSN), voicemail server (VMS), fax/modem server, short message center (SMC), conferencing facilities, and transcoders. These and other services available to the cellular network are identified through a directory agent 13.

The directory agent 13 maintains a list of all active services in the network 10 and may be each accessed through service agents (SA) by BTS agents (BA) in the wireline and wireless router layers 14 and 16 using the service location protocol specified in RFC 2608. Wireless specific services such as the mobility manager server may be defined by the service templates and service protocols defined in RFC 2609. It will be understood that services may be otherwise accessed by the wireline and wireless router layers 14 and 16 and that additional or disparate services may be provided to the router layers 14 and 16 without departing from the scope of the present invention.

The wireline router layer 14 may be a wireline specific Internet protocol (IP) layer. The wireline router layer 14 includes a wireline router network having a plurality of wireline routers 20 interconnected by physical wireline links 22. The wireline routers 20 receive and transmit traffic on the wireline links 22. The wireline router network forms the core IP network and may be the Internet, intranet, extranet, or other suitable local, wide area network, or combination of networks.

The wireless router layer 16 may be a wireless-specific IP layer. In this embodiment, the wireless router 30 provides an all-IP wireless access network with the seamless interworking with the core IP network elements in a distributed controlled architecture. In addition, the all-IP architecture is technology independent which allows the routers 30 to be provisioned to support one or more of the number of wireless access technologies. New services and features may be readily provisioned to the wireless routers 30 and new technologies supported.

The wireless router layer 16 includes a wireless router network having a plurality of wireless routers 30 interconnected by wireless router links 32. It will be understood that other suitable types of wireless nodes may be used in the wireless layer 16 without departing from the scope of the present invention. The wireless router links 32 may be microwave or other wireless links or virtual or other suitable paths configured in the wireline links 22 of the wireline IP layer 14. Each wireless router 30 may be implemented as a discrete node independent of a wireline router 20 or may be implemented as a logical layer in a wireline router 20.

The wireless routers 30 intercommunicate traffic and control information to perform call set up, resource reservation, mobility management, soft handoff, and air bandwidth allocation and routing. The wireless router links 32 may comprise multi-protocol label switch (MPLS) or other suitable virtual tunnels formed in the wireline links 22. Further information on call processing functionality and the MPLS paths of the wireless routers 30 is described in co-owned U.S. Patent Application entitled "Wireless Router and Method for Processing Traffic in a Wireless Communications Network," previously incorporated by reference.

The wireless routers 30 are connected to the wireline routers 20 by wireline links. In this way, the wireless routers 30 provide connectivity from the wireless portion of the network 10 to the wireline portion of the network 10 via circuit switched and packet switched data protocols. Thus, the wireless routers 30 receive and route traffic over both wireline and wireless links 22 and 32.

The physical layer 18 includes a series of overlapping cells 40. Each cell 40 is supported by a corresponding wireless router 30 and may be subdivided into a plurality of geo-location areas 42. The geo-location areas 42 are each a defined area in which bandwidth may be allocated to mobile devices 44. Further information regarding the geo-location areas and allocation of bandwidth within geo-location areas is described in co-owned U.S. patent application Ser. No. 09/466,308, entitled "Method and System for Allocating Bandwidth in a Wireless Communications Network," filed Dec. 17, 1999, which is hereby incorporated by reference.

In the wireless network 10, each wireless router 30 provides a radio frequency (RF) link for mobile devices 44 within a corresponding cell 40. The wireless RF link to the mobile devices 44 in the cell 40 may be based on established technologies, or standards such as IS-54 (TDMA), IS-95 (CDMA), GMS and AMPS, 802.11 based WLAN, or new upcoming technologies such as CDMA 2000 and W-CDMA or proprietary radio interfaces. The mobile devices 44 may be cell phones, data phones, data devices, portable computers, or any other suitable device capable of communicating information over a wireless link.

Due to the nature of the RF airlink, the interference generated by the usage of various mobile devices 44 is inter-dependent. That is, the interference generated by the usage of a mobile device 44 including transmitting and receiving signals is not only dependent on its geo-location, but is also dependent on the geo-location of surrounding mobile devices 44 and the usage of those devices. Thus, the cellular network is an inherently interference-limited network with bandwidth usage in a particular location impacting the interference in specific areas of the neighborhood. In complete spectrum sharing systems such as CDMA and W-CDMA, bandwidth usage in a particular area directly impacts the bandwidth available at different locations in the neighborhood.

In operation, the wireless routers 30 each have a defined bandwidth with which to communicate with the mobile devices 44 in the cells 40. The bandwidth is used by the wireless router 30 and the mobile devices 44 to communicate voice and data information. The supported bandwidth is a function of various factors such as frequency reuse, carrier to interface ratio, bit-energy to noise ratio, effective bit-rate per connection and the like. The bandwidth available to allocate to certain flows is geo-location dependent, and time dependent based on current usage of other flows in the geo-neighborhood.

The wireless routers 30 each allocate bandwidth within a corresponding cell 40, route traffic to and from the cell 40, and track the location of the mobile devices 44 within the cell 40. The position of a mobile device 44 may be determined using network-assist, global position systems (GPS), and radio frequency fingerprinting. Preferably, the positioning technique provides fast and accurate information with respect to the location of the mobile device 44 to minimize acquisition time for position information. As mobile users move from cell 40 to cell 40, the wireless routers 30 perform soft handoff operations to provide continuous connectivity within the network.

As described in more detail below, the wireless routers 30 automatically configure themselves upon activation or other suitable event to determine and account for the changes in RF topology of the network 10. In configuring themselves, the wireless routers 30 use wireline and/or wireless links to identify and negotiate parameters with neighboring wireless routers 30 in the RF topology. Thus, the wireless routers 30 build the wireline topology and then apply RF knowledge by exchanging information through the wireline network to build the wireless topology. It will be understood that other types of routers and base stations may be similarly configured in accordance with the present invention.

Figure 2:
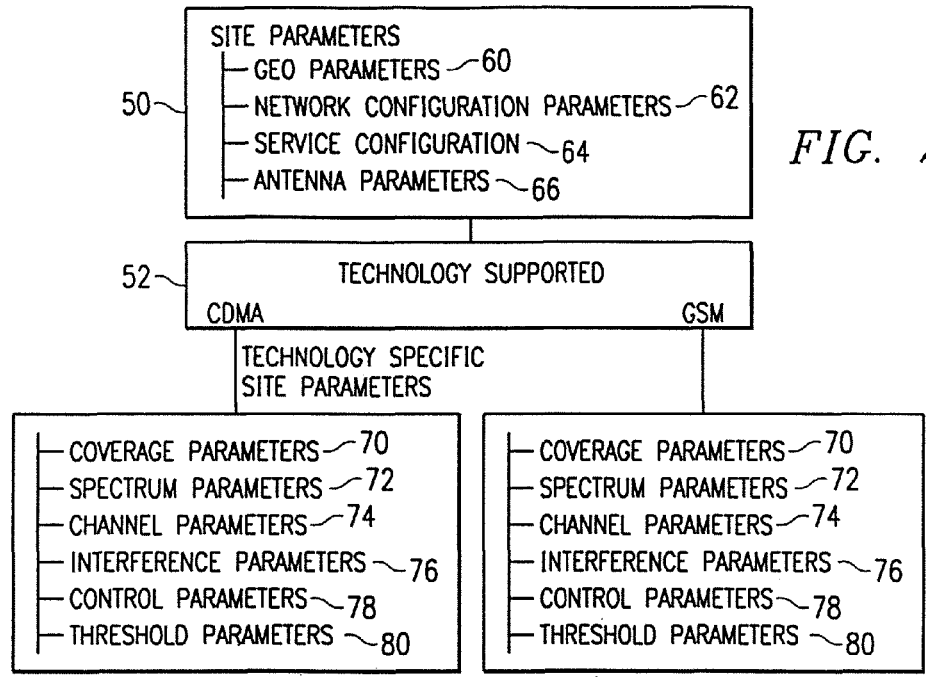
FIG. 2 is a block diagram illustrating technology independent and specific site parameters for configuring the wireless routers of FIG. 1 in accordance with one embodiment of the present invention.

FIG. 2 illustrates technology independent and technology specific site impact parameters that may be exchanged between the wireless routers 30 to configure the wireless-specific router layer 16. It will be understood that other suitable parameters that allow a wireless router to determine, estimate, and/or predict interference and/or impact of its operation on another wireless router or operation of another wireless router on itself maybe exchanged between wireless routers 30 for self configuration of the routers 30 and the network.

Referring to FIG. 2, the technology independent site parameters 50 include geo-parameters 60, network configuration parameters 62, service configurations 64, and antenna parameters 66. Where different technologies are used to support different technologies, technology dependent antenna parameters may also or instead be provided. Technology supported parameters 52 for CDMA and GSM, for example, may include coverage parameter 70, spectrum parameter 72, channel parameter 74, interference parameter 76, control parameter 78, threshold parameter 80 and traffic engineering parameters 82.

FIG. 3 illustrates details of the technology independent and technology specific parameters in accordance with one embodiment of the present invention. In this embodiment, the geo-parameters 60 include a site ID, a number of sector/beams, sector/beam ID, latitude and longitude, sector/beam orientation, and maximum radius of influence. The network configuration parameters 62 include interface to a network (T1, SONET, T3, fractional T1), site capacity, and network capacity. The service configurations 64 include DA address and services supported. The antenna parameters 66 include antenna type, digitized antenna pattern, antenna beamwidth (horizontal and vertical), antenna maximum gain, and antenna down tilt (mechanical and electrical).

For the technology specific parameters 52, the coverage parameter 70 includes environment, path loss margin, technology specific RF hardware losses and gains, RF coverage prediction models, and traffic distribution maps. The spectrum parameters 72 include channel bandwidth, channel mask, channel number range, and maximum transmit power per channel technology. The channel parameter 74 include the number of channels in the range, air capacity/bandwidth, minimum channel spacing, frequencies use, frequency grouping, and hopping sequences. The interference parameter 76 includes interference thresholds, power control thresholds, channelization and sequencing, channel scheduling algorithms, RF interference prediction models, traffic distribution maps, and adjacent channel interference thresholds. The control parameter 78 includes access parameters, intra technology handoff parameters, inter technology handoff parameters, and timing parameters. The threshold parameters 80 include percentage of call blocks, percentage of access failures, percentage of call drops, maximum delay, packet error rate (PER), maximum round trip delay (RTD), and frame error rate (FER). The traffic engineering parameters 82 include class of service, congestion control algorithms and parameters, queuing algorithms and parameters, and minimum and maximum resource allocation for class of service.

Figure 4:
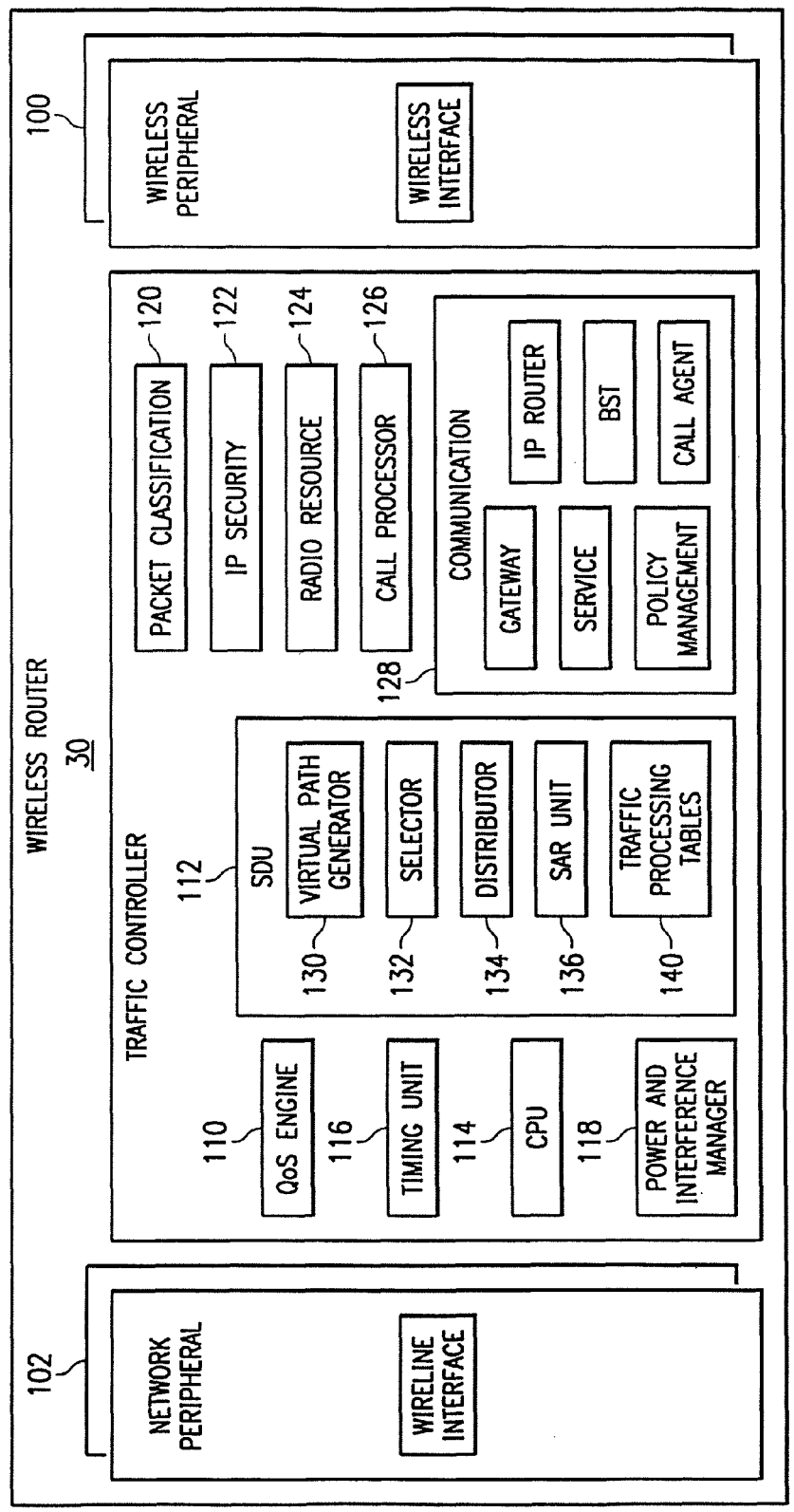
FIG. 4 is a block diagram illustrating details of the wireless router of FIG. 1 in accordance with one embodiment of the present invention.

FIG. 4 illustrates details of the wireless router 30 in accordance with one embodiment of the present invention. In this embodiment, the wireless router 30 is implemented in a card-shelf configuration with its functionality distributed between wireless peripheral cards 100, network peripheral cards 102, and traffic controller cards 104. The cards are connected by a mesh network, one or more buses, a backplane, or other suitable communication channel. Similarly, within each card, components are connected by a mesh network, one or more busses, a backplane, or other suitable communication channel.

Referring to FIG. 4, the wireless and wireline peripheral 100 and 102 may each include an interface and a network information base for processing and handling traffic received from the wireless and wireline portions of the network, respectively. The wireless peripheral 100 may include a plurality of cards to handle disparate access technologies. Similarly, the network peripheral 102 may include disparate types of cards for connections to disparate line formats. Thus, each wireless router 30 may support a plurality of wireless and wireline technologies. The wireless peripheral 100 may be directly connected to a radio front end which may be internal or external to the wireless router 30.

For self-engineering, the network peripheral 102 is used to identify the IP topology of the wireline network and to configure the wireless router 30 to use the wireline typology. The wireless and/or network peripheral 100 or 102 use the wireline connectivity established by the network peripheral 102 to identify the RF topology, negotiate parameters with neighboring wireless routers 30 and configure the wireless router 30 based on the negotiated parameters for operation in conjunction with the neighboring wireless routers 30. The traffic controller 10 is configured based on the negotiated parameters to control transmission resources for the wireless router 30.

In operation, the wireless and network peripheral 100 and 102 characterize and label packets for routing and grouping by the traffic controller 104. The traffic controller 104 may include a QoS engine 110, a synchronization and distribution (SDU) unit 112, a central processing unit (CPU) 114, a timing unit 116, a timing and an interference manager 118, a packet classification module 120, an IP security module 122, a radio resource module 124 a call processor 126, and communication module 128. The SDU 112 may include a virtual path generator 130, selector 132, distributor 134, segmentation and reassembly (SAR) unit 136, and traffic processing tables 140 that are configured by the wireless router 30 during start up based on the RF topology of the network. Further information regarding the wireless router 30 and network peripheral 100 and 102 and the traffic controller 104 are described in co-owned U.S. Patent Application entitled "Wireless Router and Method for Processing Traffic in a Wireless Communications Network," previously incorporated by reference.

Figure 5:
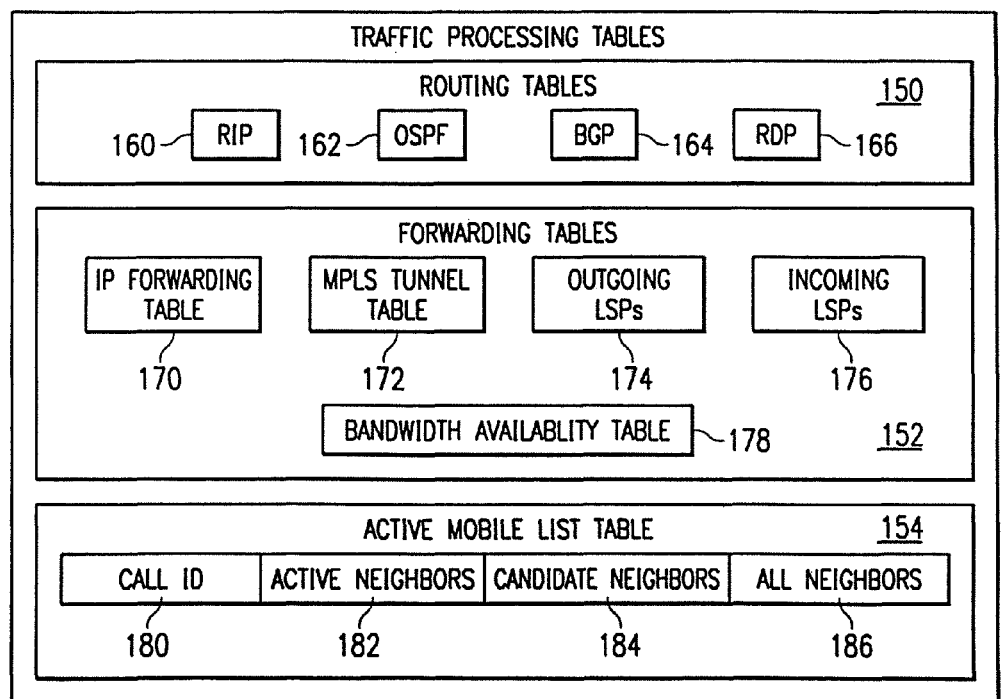
FIG. 5 is a block diagram illustrating details of the traffic processing tables of FIG. 4 in accordance with one embodiment of the present invention.

FIG. 5 illustrates details of the traffic processing tables 140 in accordance with one embodiment of the present invention. In this embodiment, the traffic processing tables 140 includes routing tables 150, forwarding tables 152, and an active mobile list table 154. The routing tables 150 includes a RIP table 160, OSPF table 162, BGP table 164 and a radio discovery protocol (RDP) table 166. The routing tables 160 are configured during self-engineering of the wireless router 30 and used to construct the forwarding tables 152.

The forwarding tables 152 include an IP forwarding table 170, an MPLS tunnel table 172, an outgoing LSP table 174, an incoming LSP table 176, and an bandwidth availability table 178. The IP forwarding table 170 represents the IP topology of the network 10. The MPLS tunnel table 172 represents the RF topology of the network 10. The outgoing LSP table 174 identifies multicasts LSPs for soft handoff call processing. The incoming LSP table 176 identifies LSPs of selection operations for soft handoff call processing. The bandwidth activity table 178 provides reserved and available bandwidth for soft handoff call processing.

The active mobile list table 154 is maintained on a per call basis. For each call, the active mobile list table 154 stores a call identifier 180, active neighbors 182, candidate neighbors 184 and all neighbors 186. Further information regarding the routing tables 150, forwarding tables 152 including the IP forwarding, MPLS tunnel, outgoing LSP and incoming LSP tables 170, 172, 174 and 176, and active mobile list table 154 is described in connection with co-owned U.S. Patent Application entitled "Wireless Router and Method for Processing Traffic in a Wireless Communications Network," previously incorporated by reference.

Figure 6:
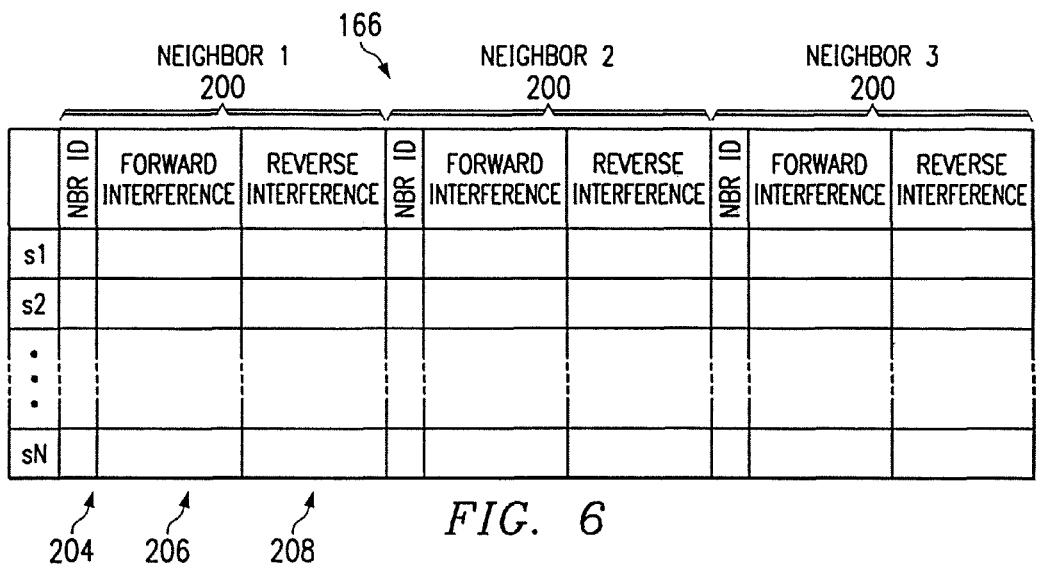
FIG. 6 is a block diagram illustrating details of the radio discovery protocol (RDP) table of FIG. 5 in accordance with one embodiment of the present invention.

FIG. 6 illustrates the RDP table 166 in accordance with one embodiment of the present invention. In this embodiment, the RDP table 166 stores neighbor information 200 for each neighbor of a sector or beam ID for a cell 40. The neighbor information 200 may include a neighbor ID and type (adjacent or co-channel) 204, forward interference 206, and reverse interference 208. Adjacent neighbors are identified by coverage analysis while co-channel neighbors are identified by interference analysis. The interference information may be generated by coverage, interference, and parameter analysis during start-up of the wireless router 30 and refined during operation from the real time measurement data and/or in response to a change in neighbors and/or parameters for neighbors.

Figure 7:
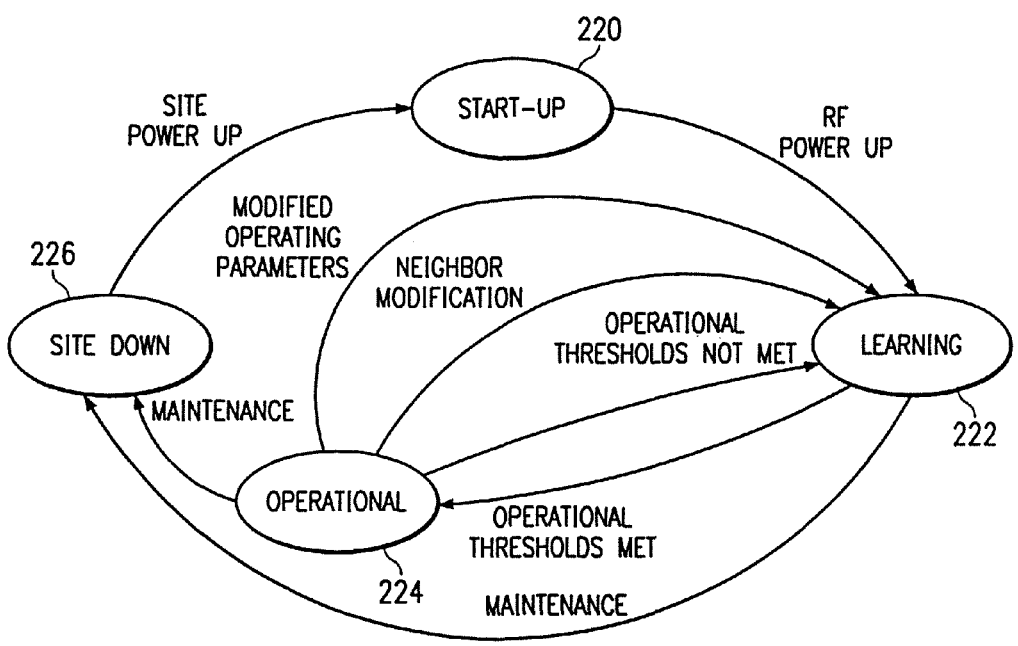
FIG. 7 is a state diagram illustrating states of the wireless router of FIG. 1 in accordance with one embodiment of the present invention.

FIG. 7 illustrates a state diagram for the wireless router 30 in accordance with one embodiment of the present invention. In this embodiment, the wireless router 30 includes a RF start-up state 220, a RF learning state 222, a RF operational state 224, and a RF down state 226. As described in more detail below, the wireless router 30 configures the RF and/or IP topology in the start up state 220 and refines the topology in the learning state 222. In the operational state 224, the wireless router 30 handles a full traffic load and continues to ensure compliance with operational thresholds. In the site down state 226, the wireless router 30 may be in scheduled or unscheduled maintenance.

The wireless routers 30 are each connected to at least one wireline router 20 or connected in a set that is connected to one wireless router 20. Because no direct connections exist between the wireless routers 30 in the RF physical medium, communication between the wireless routers 30 is conducted over wireline paths 22. In addition, because no direct wireline paths 22 may exist between the wireless routers 30, the wireline paths 22 are used to identify the RF topology. Thus, in the starting state 220 connectivity is first established between a wireless router 30 and wireline routers 20 in the network. The wireline connectivity is then used to establish connectivity between the wireless router 30 and neighboring wireless routers 30. Connectivity between wireless routers 30 is established by identifying the neighboring wireless routers 30 and configuring the wireless routers 30 with that information. In addition, multiple protocol label switch (MPLS) paths or other suitable virtual circuits or IP tunnels may be established between the neighboring wireless routers 30 to facilitate communications. It will be understood that other suitable types of paths or routing may be used for communication between neighboring wireless routers 30 over the wireline links 22.

After and/or as part of establishing the wireless connectivity with neighboring wireless routers 30 in the start up state 220, the wireless router 30 exchanges RF impact information including some or all of the technology independent or technology specific parameters and negotiates operating parameters with the neighboring or potentially neighboring wireless routers 30. By exchanging and negotiating parameters, each wireless router 30 is able to determine or estimate a set of operating parameters that will maximize radio coverage and minimize interference in the wireless network and provide continuous coverage via smooth handovers from cell to cell. If no agreement can be reached between wireless routers 30, the matter may be referred to an operation administration and maintenance server (OAM) for resolution. The OAM server may then perform the RF impact analysis and respond with the operational parameters for the new site and neighboring sites. The OAM server may also reidentify neighbor sites after parameters are agreed to, they are stored in the configuration and parameter tables for the wireless router 30 and the wireless 30 transitions to the learning state 222. In this way, the RF system and RF network may be built by simply activating the wireless routers 30.

In the learning state 222, the wireless routers 30 continue to exchange and/or negotiate parameters in order to minimize interference in the wireless network and to ensure that all operational thresholds are met. In particular, the set of neighboring wireless routers 30 may be modified to more accurately reflect the RF topology or in response to another site activating or deactivating, bandwidth maybe exchanged, and/or other parameters modified to improve efficiency and/or throughput and to minimize RF interference in the network. Thus, in the learning state 222, parameters are renegotiated based on operational feedback. After operational thresholds have been met for a specified period of time, the wireless router 30 transitions to the operational state 224. Typically, the wireless router 30 may remain in the learning state for a period of a few days to a few weeks.

In the operational state 224, the wireless router 30 continues to monitor its operational thresholds and/or periodically or otherwise exchange information with neighboring wireless routers 30 to ensure maximum efficiency and minimum RF interference within the wireless network. In response to operational thresholds no longer being met, the wireless router 30 transitions from the operational state 224 back to the learning state 222 for detailed analysis and evaluation of the configuration parameters and reconfiguration as necessary to meet threshold parameters.

In addition, in response to neighbor modification by an existing neighbor shutting down or a new neighbor activating, the wireless router 30 transitions from the operational state 224 back to the learning state 222 for detailed analysis and evaluation of a new set of neighbors and configuration based on that set of neighbors. In response to a modification of operational parameters due to requests from neighboring routers, the wireless router 30 also transitions from the operational state 224 back to the learning state 222 for analysis and evaluation of operation using the modified parameters.

The wireless router 30 may enter the site down state 226 from the learning state 222 or the operational state 224 in response to scheduled or unscheduled maintenance. In response to RF power up, the wireless router 30 will transition back to the start up state 220 for reloading and/or reconfiguration of the operational parameters. In this way, the wireless routers 30 automatically adjust and account for changing conditions in the network 10 to optimize operation of the network.

Figure 8:
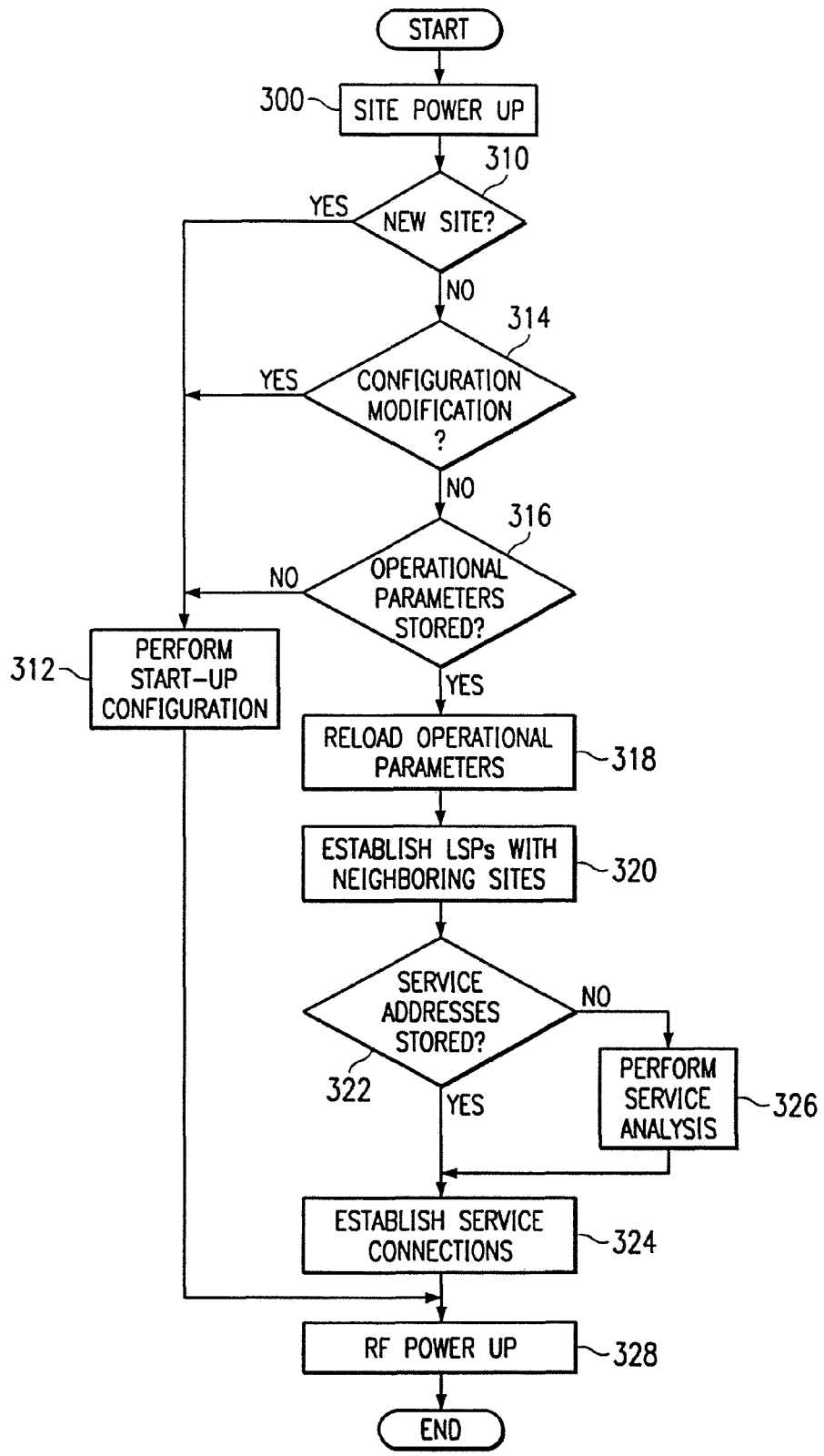
FIG. 8 is a flow diagram illustrating methodology of the start up state of FIG. 7 in accordance with one embodiment of the present invention.

FIG. 8 is a flow diagram illustrating methodology to start up state 220 of the wireless router 30 in accordance with one embodiment of the present invention. The method begins at step 300 with site activation upon electrical power up or other suitable event. The activation may be an initial activation of the site or a reactivation of the site in response to a fault, maintenance, or other condition causing the wireless router 30 to be deactivated. At this point, the RF system remains down and in need of configuration.

Proceeding to decisional step 310, wireless router 30 determines whether it is a new site that has not been previously configured. If the site is a new site that has not been previously configured, the Yes branch of decisional step 310 leads to step 312 in which the start up configuration is performed for the new site. Further information regarding the start up configuration is described below in connection with FIGS. 9-11. If the site is not a new site but has been previously configured, the No branch of decisional step of 310 leads to step 314. At step 314, the wireless router 30 determines whether its configuration has been modified. If the configuration has been modified, the Yes branch of decisional step 314 leads to decisional step 312 for start up configuration. If the configuration of the site has not been modified, the No branch of decisional step 314 leads to decisional step 316.

At decisional step 316, the wireless router 30 determines whether its operational parameters are stored. If the operational parameters and tables are not stored, the No branch of decisional step 316 leads also to step 312 for start up configuration. If the operational parameters and tables are stored, the Yes branch of decisional step 316 leads to step 318. At step 318, the operational parameters are reloaded into active memory of the wireless router 30. Next, at step 320, LSPs or other virtual circuits or tunnels are established with the neighboring sites based on the operational parameters.

At decisional step 322, the wireless router 30 determines whether service address information is stored for call services. If service addresses are stored in the wireless router 30, the Yes branch of decisional step 322 leads to step 324 in which service connections are established. If the service addresses are not stored, the No branch of decisional step 322 leads to step 326 in which service analysis is performed. Step 326 also leads to step 324 in which service connections are established based on the service analysis.

As described in more detail below, during start up configuration at step 312, neighbors for the wireless router 30 are identified, interference impact calculated, parameters exchanged and negotiated, and service connections established. After start up configuration, step 312 along with step 324 lead to step 328 in which the RF system is powered up for the wireless router 30. In this way, the wireless router automatically configures itself for operation in the wireless network. Upon completion of start up process, the wireless router 30 transitions to the learning state 222.

Figure 9:
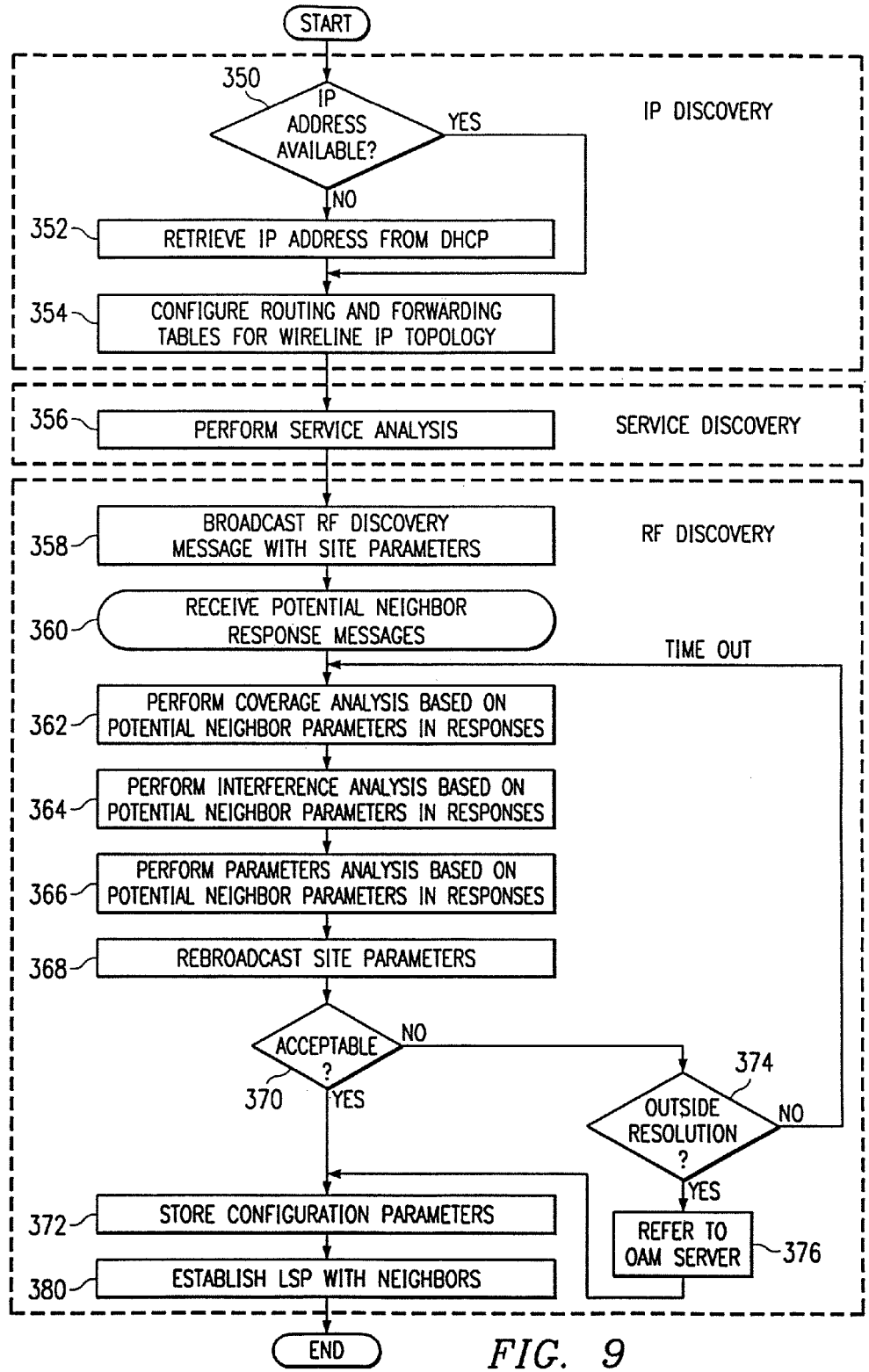
FIG. 9 is a flow diagram illustrating a method for the start up configuration of FIG. 8 in accordance with one embodiment of the present invention.

FIG. 9 illustrates a method for start up configuration of a wireless router 30 in accordance with one embodiment of the present invention. In this embodiment, IP discovery is first performed at steps 350-354, followed by service discovery at step 356, and RF discovery at steps 358-368. This allows the core IP network to be used for service and RF discovery and services such as OAM for conflict resolution in RF discovery. In another embodiment, the wireless router 30 may be pre-configured prior to initial start up and transition to the learning state 222 with minimal or no additional configuration in the start up state 220.

Referring to FIG. 9, the method begins at step 350 in which the wireless router 30 determines whether an IP address is available for the wireless router 30. If the IP address is not available, the No branch of decisional step 350 leads to step 352. At step 352, the IP addresses are retrieved from the DHCP server. If the address is available at decisional step 350 or upon retrieving the address from the DHCP at step 352, the Yes branch of decisional step 350 and step 352 lead to step 354. At step 354, the wireless router 30 configures its routing and forwarding tables for the wireline IP topology.

At step 356, service discovery is performed using the service analysis function. As described in more detail below in connection with FIG. 12, the service analysis function may use an existing directory agent, locate a directory agent, or itself broadcast messages in the network to identify services.

Proceeding to step 358, RF discovery is performed by broadcasting an RF discovery search message with a set of site specific impact parameters. The discovery search signal is propagated to regional wireless routers using the wireline connectivity. Propagation of the search signal may be limited by including a time-to-live parameter with a message or a hop count that is decremented each time the message is forwarded from one router to another.

Next, at step 360 the wireless router 30 waits to receive potential neighbor response messages. The response messages are generated and transmitted by potential neighbors and include detailed RF impact information for analysis by the wireless router 30. In response to a time out or other suitable event, step 360 transitions to step 362 in which performance coverage analysis is performed based on coverage impact parameters in the potential neighbor responses. At step 364, interference analysis is performed based on interference impact parameters in the potential neighbor responses. Similarly, at step 366, performance parameter analysis is performed based on performance interference impact parameters in the potential neighbor responses. The analysis functions identify co-channel or adjacent neighbors of the wireless routers, exchange information with the neighbors and negotiate parameters for operation of the wireless router 30. Further details on the coverage, interference, and parameter analysis functions are described in more detail below in connection with FIGS. 13 and 14, 15 and 16, and 17 and 18, respectively.

At step 368, the parameters determined by the coverage, interference, and parameter analysis functions are rebroadcast for evaluation by neighboring wireless routers 30. At decisional step 370, the neighboring routers each evaluate the parameters to determine if they are acceptable. If the parameters are acceptable to the neighboring sites, the Yes branch of decisional step 370 leads to step 372 at which the configuration parameters are stored for the wireless router 30. If the proposed parameters are unacceptable to the neighboring sites due to interference, coverage area, bandwidth or otherwise, the No branch of decisional step 370 leads to decisional step 374.

At decisional step 374, the wireless router 30 determines whether outside resolution of the conflict is required. In one embodiment, outside resolution may be required when resolution between the wireless router 30 and the neighbor has not occurred through a specified number of negotiations or within a specified period of time. If outside resolution is not yet required, the No branch of decisional step 374 returns to step 362 for reanalysis of coverage, interference, and parameters based on information received from the conflicting neighboring sites. If after a specified period of negotiations or time resolution cannot be reached with the conflicting neighboring site or sites, the Yes branch of decisional step 374 leads to step 376 at which the matter is referred to the OAM server. The OAM server will itself perform coverage, interference and parameter analysis and dictate the parameters to the conflicting sites. Step 376 leads to step 372 where the configuration parameters set by the OAM server are stored.

At step 380, LSPs are established with the neighboring wireless routers 30. The LSPs provide a virtual tunnel for communication between the neighboring wireless routers 30. Step 380 leads to the end of the process by which the wireless router 30 is automatically configured upon activation. The discovery messaging, negotiations and analysis may be used to automatically configure base stations and other types of suitable routers.

Figure 10:
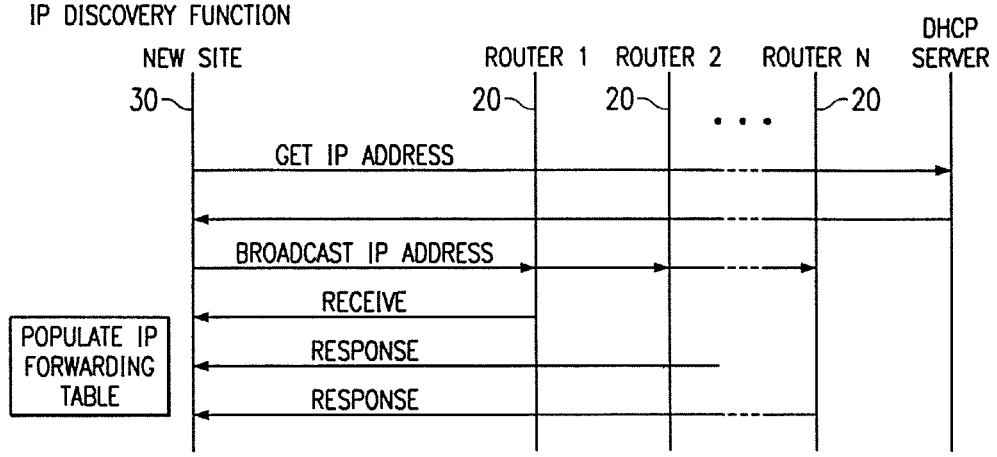
FIG. 10 is a call flow diagram for the Internet Protocol (IP) discovery function of FIG. 9 in accordance with one embodiment of the present invention.

FIG. 10 illustrates a call flow diagram for the IP discovery function in accordance with one embodiment of the present invention. In this embodiment, the wireless router 30 communicates with wireline router 20 and a DHCP server to populate the IP forwarding table 170. In particular, the wireless router 30 requests and receives an IP address from the DHCP server. Next, the wireless router 30 broadcasts an IP discovery request including the IP address to regional wireline router 20. Replies from the neighboring routers 20 are received and used to populate the IP forwarding table 170.

Figure 11:
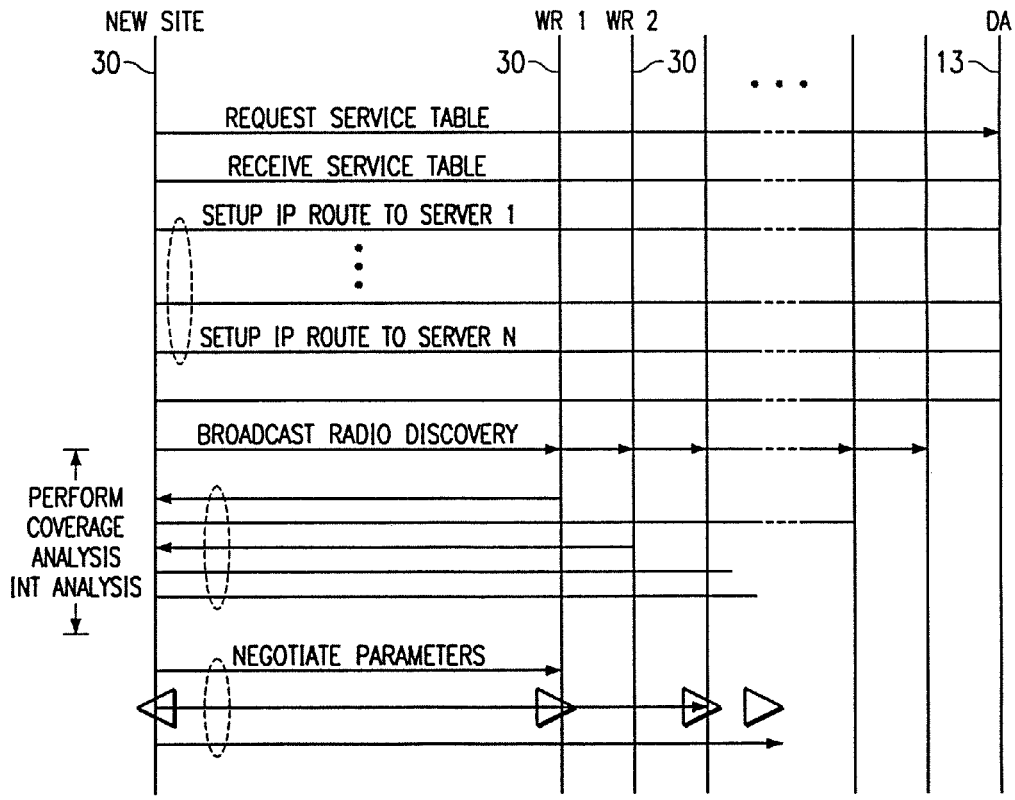
FIG. 11 is a call flow diagram for the radio frequency (RF) discovery function of FIG. 9 in accordance with one embodiment of the present invention.

FIG. 11 illustrates a call flow for the radio discovery function in accordance with one embodiment of the present invention. In this embodiment, the wireless router 30 communicates with the directory agent 13 and with other wireless routers 30 in the wireless router network. In particular, the new wireless router 30 communicates with the directory agent 13 to request and receive service tables identifying service addresses. Based on the service address, the wireless router 30 communicates with the service servers to set up an IP route to each of the servers. Servers may include an OAM server to resolve any conflicts between wireless routers 30.

Next, the new wireless router 30 broadcasts a radio discovery message including site impact parameters for analysis by regional wireless routers 30. Each wireless router 30 receiving the radio discovery message will evaluate the site impact parameters and respond with detailed parameters if it is a potential neighbor to the new site. Based on the responses, the wireless router 30 performs coverage, interference, and parameter analysis to identify and negotiate with neighboring wireless routers. Thus, the parameters identified by each set of analysis are rebroadcast to neighbors for review and approval. Upon completion of negotiations or referral to an OAM server, the neighboring wireless routers and operational parameters are finalized and the RDP table 166 populated and used to generate the MPLS tunnel table 172, outgoing LSP table 174, and incoming LSP table 176.

Figure 12:
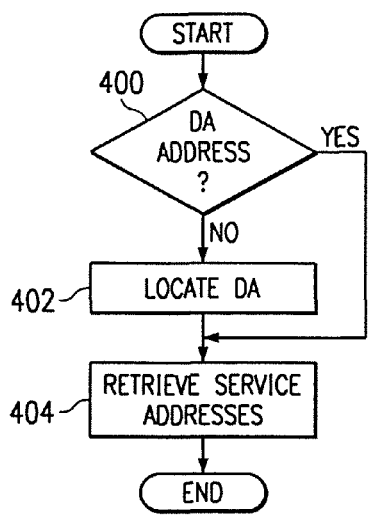
FIG. 12 is a flow diagram illustrating a method for performing the service analysis function of FIG. 9 in accordance with one embodiment of the present invention.

FIG. 12 is a flow diagram illustrating the service analysis function of FIGS. 8 and 9 in accordance with one embodiment of the present invention. In this embodiment, the method begins at decisional step 400 in which the wireless router 30 determines whether it has an address for the directory agent 13. If the directory agent 13 address is not locally available, the No branch of decisional step 400 leads to step 402 in which the wireless router 30 locates the directory agent 13 with a broadcast message through the wireline network. If the directory address is available at decisional step 400, the Yes branch of decisional step 400 as well as step 402 lead to step 404. At step 404, the wireless router 30 retrieves service addresses from the directory agent 13. Step 404 leads to the end of the process by which service addresses are obtained by the wireless router 30 over the wireline network for use of establishing service connections with the core IP network and OAM servers for conflict resolution.

Figure 13:
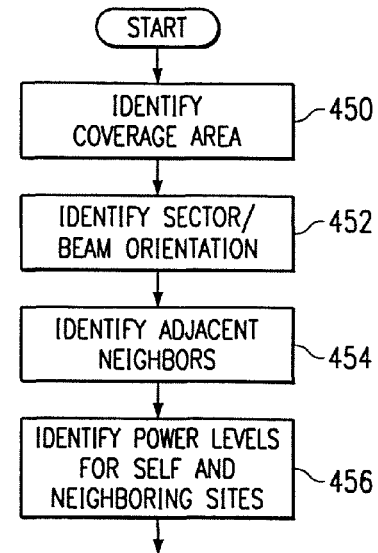
FIG. 13 is a flow diagram illustrating a method for performing the coverage analysis function of FIG. 9 in accordance with one embodiment of the present invention.

FIG. 13 is a flow diagram illustrating the coverage analysis function in accordance with one embodiment of the present invention. In this embodiment, the method begins at step 450 in which the coverage area of each responding wireless router 30 is identified. At step 452, the selector/beam orientation of the responding wireless routers 30 are identified.

Proceeding to step 454 adjacent, co-channel or other handoff neighbors are identified using technology specific parameters of each wireless router 30 responding to the RF discovery search method. At step 456, the power levels for the activated and neighboring wireless routers 30 are identified based on the coverage area, selector/beam orientation and other parameters provided by the responding sites. In this way, the activated wireless router may determine the coverage area of its own and of each responding wireless router 30.

Figure 14:
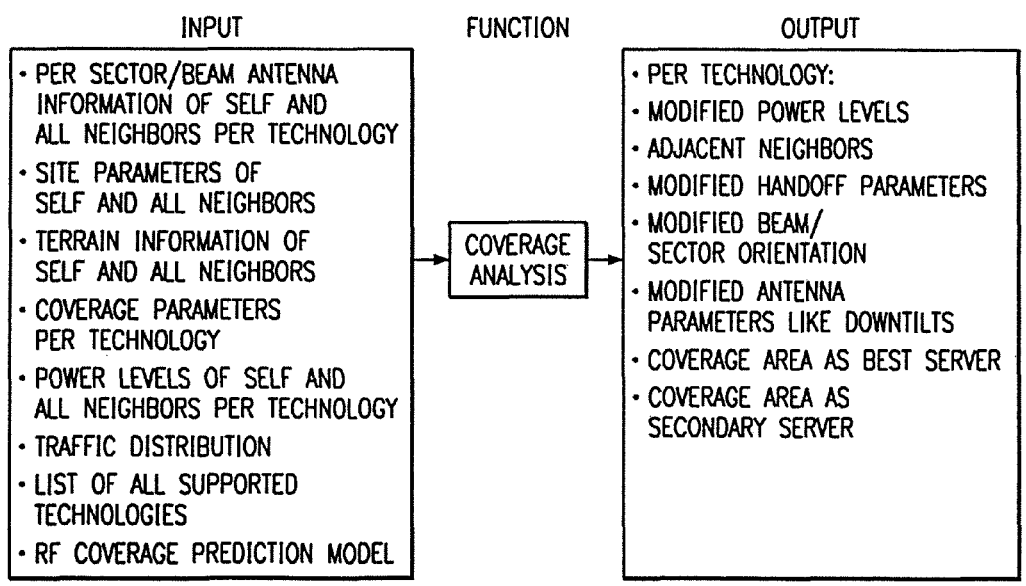
FIG. 14 is a block diagram illustrating the coverage analysis function of FIG. 9 in accordance with one embodiment of the present invention.

FIG. 14 is a block diagram illustrating the coverage analysis function of FIG. 9 in accordance with one embodiment of the present invention. In this embodiment, the coverage analysis function analyzes antenna information, site parameters, terrain information, power, coverage parameters per technology, and traffic distribution parameters of the wireless routers 30 to determine coverage for the activating and neighbor wireless routers. Based on the coverage parameters, adjacent neighbors, modified handoff parameters, modified beam orientation, modified antenna parameters, coverage area as best server and coverage as secondary server as well as modified power levels are determined and the RDP table 166 populated.

Figure 15:
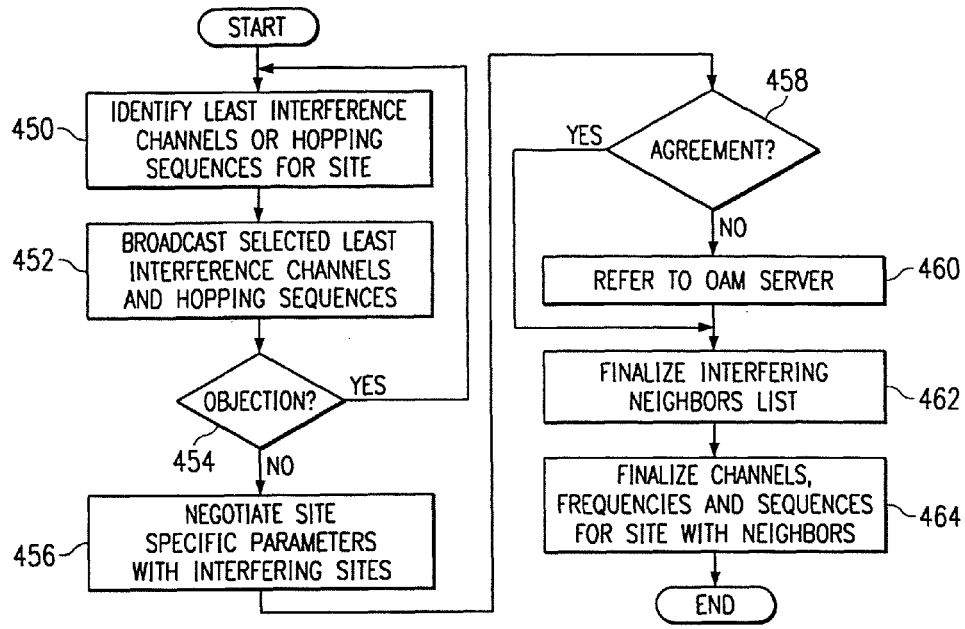
FIG. 15 is a flow diagram illustrating a method for performing the interference analysis function of FIG. 9 in accordance with one embodiment of the present invention.

FIG. 15 is a flow diagram illustrating a method for performing the interference analysis function of FIG. 9 in accordance with one embodiment of the present invention. In this embodiment, the method begins at step 450 in which the channel/frequency or hopping sequences that would cause the least interference are identified using specific traffic and channel parameters and site impact information received from the neighbors. If sufficient channel and/or hopping sequences are not available, the matter may be referred to the OAM server for resolution as described below.

Proceeding to step 452, the channel/frequency selections along with interference impact information are broadcast to all regional wireless routers 30 for interference evaluation. This allows a router that did not respond to the discovery message to now respond and the activated wireless router 30 to be configured accordingly. At decisional step 454, if a wireless router 30 responds with an objection, the Yes branch returns to step 450 in which the least interference channels are again identified based on the new information. After all objections have been taken into account, the No branch of decisional step 454 leads to step 456. At step 456, site specific parameters changes such as antenna down tilt and power levels are negotiated to reduce interference for both the activating and interfering sites.

At decisional step 458, if a set of parameters cannot be agreed to between the activating and the neighbor sites, the No branch of decisional step 458 leads to step 460. At step 460, the matter is referred to an OAM server for resolution. Step 460 along with the Yes branch of decisional step 468 lead to step 462 in which the interfering neighbors are finalized by negotiations that include coverage and interference reanalysis or by resolution by the OAM server.

At step 464, the group of channel/frequency/hopping sequences finalized and the group of co-channel neighbors identified. The interference entries of the RDP table 166 are then populated. Step 464 leads to the end of the process by which neighboring sites are analyzed and negotiated with to resolve interference conflicts and/or issues.

Figure 16:
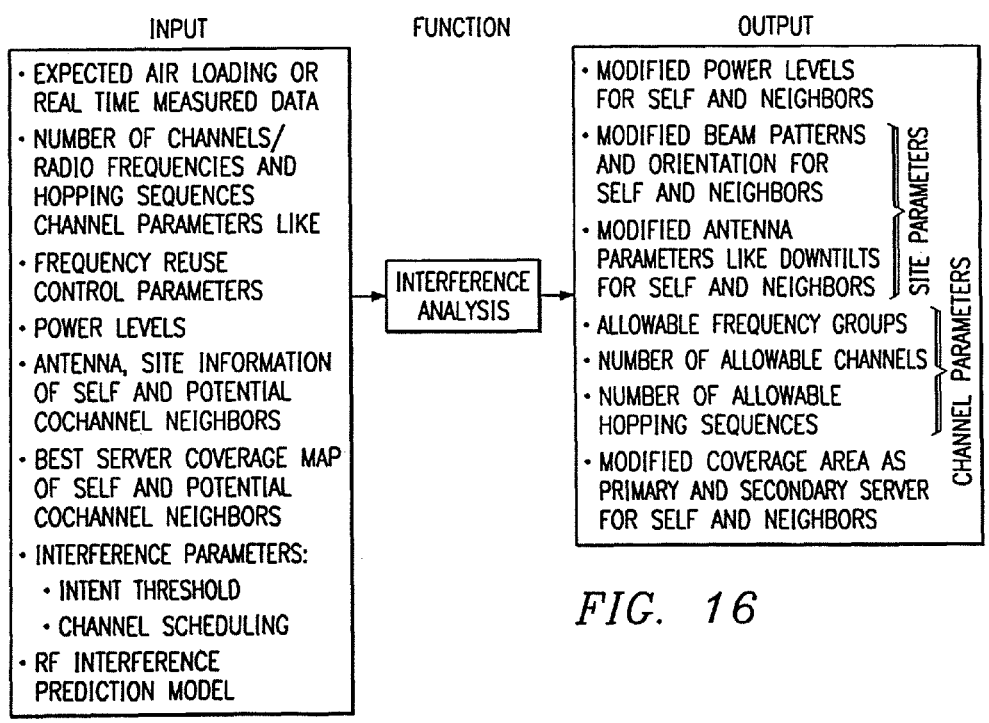
FIG. 16 is a block diagram illustrating the interference analysis function of FIG. 9 in accordance with one embodiment of the present invention.

FIG. 16 illustrates the interference analysis function of FIG. 9 in accordance with one embodiment of the present invention. In this embodiment, the interference analysis function analyzes expected air loading, real time measure data if available, number of channels/radio frequency and hopping sequences including channel parameters, frequency reuse including control parameters, power levels as well as antenna, site information, best server coverage maps and potential co-channel neighbors to determine interference between the sites. Based on the interference analysis, modified power levels, modified beam patterns and orientation, modified antenna parameters such as down tilts and modified coverage area as primary and secondary server are identified for the activated and neighboring sites. Allowable frequency groups, number of allowable channels, and number of hopping sequences are also identified. Based on the modified and identified information, the RPD table 166 is populated for configuration of the wireless router 30 to the RF topology. The site parameters are also updated.

Figure 17:
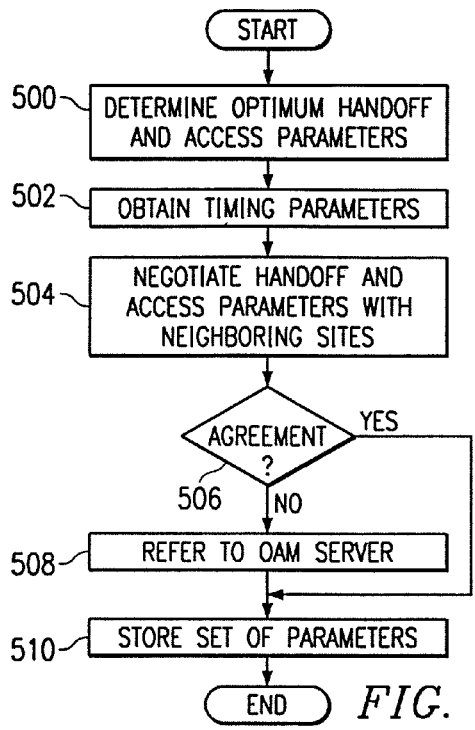
FIG. 17 is a flow diagram illustrating a method for performing the parameter analysis function of FIG. 9 in accordance with one embodiment of the present invention.

FIG. 17 is a flow diagram illustrating a method for performing the parameter analysis function of FIGURE 9 in accordance with one embodiment of the present invention. In this embodiment, the method begins at step 500 in which handoff and access parameters are determined based on the neighboring site information and output percent coverage analysis. At step 502, timing parameters are obtained by analyzing the neighbor information.

Proceeding to step 504, parameters with the neighboring handover and interfering sites are negotiated. Each negotiation involves coverage and interference re-analysis. At decisional step 506, if the activating and neighboring sites cannot agree to a set of parameters, the No branch leads to step 508. At step 508, the matter is referred to an OAM server for resolution. Step 508 leads to step 510 in which the parameters dictated by the OAM server are stored. If agreement is reached between the activating and neighboring sites, the Yes branch of decisional step 506 also leads to step 510 in which the agreed set of parameters are stored. Step 510 leads to the end of the process by which the wireless router 30 is configured with the initial set of parameters for operation in the wireless network.

Figure 18:
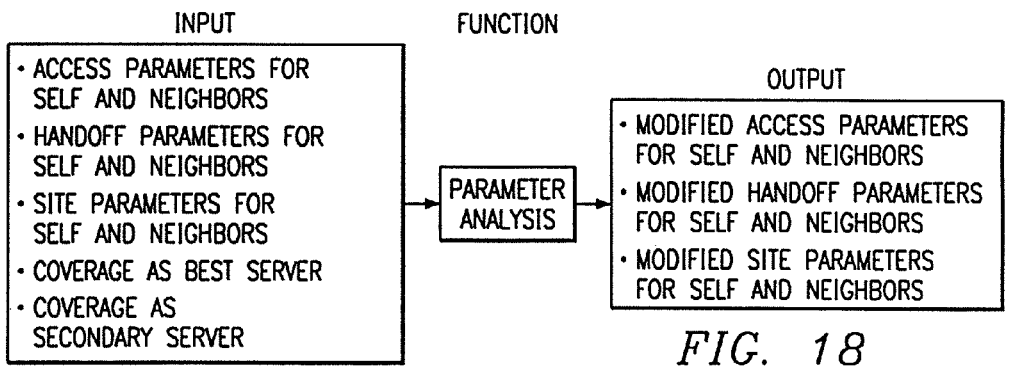
FIG. 18 is a block diagram illustrating the parameter analysis function of FIG. 9 in accordance with one embodiment of the present invention.

FIG. 18 illustrates details of the parameter analysis function in accordance with one embodiment of the present invention. In this embodiment, the parameter analysis function analyzes access parameters, handoff parameters, site parameters for the activated and neighboring sites, and coverage as best server and coverage as secondary server information to determine modified access parameters, modified handoff parameters, and modified site parameters for the activated and neighboring sites. The parameters may be negotiated with the neighboring sites and upon agreement configured for the activated site.

Figure 19:
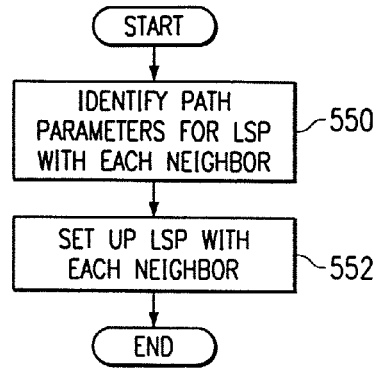
FIG. 19 is a flow diagram illustrating a method for performing the label switch path (LSP) set up function of FIG. 9 in accordance with one embodiment of the present invention.

FIG. 19 is a flow diagram illustrating a method for performing the LSP set up function of FIG. 9 in accordance with one embodiment of the present invention. In this embodiment, the method begins at step 550 in which the path parameters for LSPs and/or other types of suitable virtual circuits are identified for each neighboring site. Next, at step 552, the LSPs are set up by configuring the LSPs tables 174 and 176. Step 552 leads to the end of the process by which LSPs are set up between neighboring wireless routers 34 for soft handoff, micro mobility and other call processing functions in the wireless network.

Figure 20:
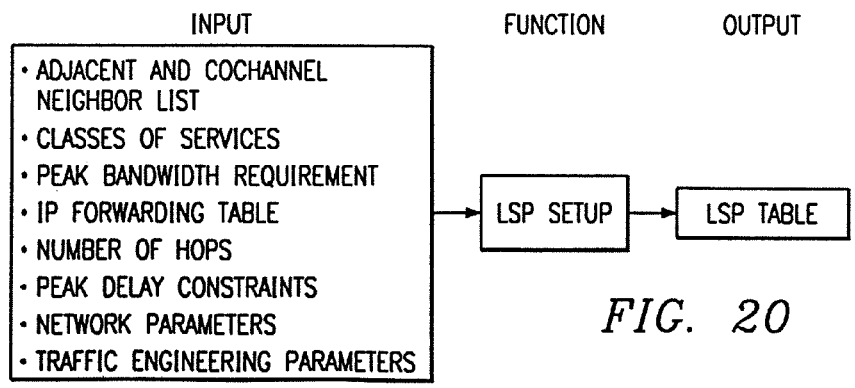
FIG. 20 is a block diagram illustrating the LSP set up function of FIG. 9 in accordance with one embodiment of the present invention.

FIG. 20 illustrates details of the LSP setup function in accordance with one embodiment of the present invention. In this embodiment, the LSP set up function analysis adjacent and co-channel neighbors, classes of services, peak bandwidth requirements, the IP forwarding and routing tables, the number of hops and the peak delay constraints to determine the LSPs for the activated site. Based on the LSP analysis, the LSP tables are configured to allow inter router communication for call processing.

Figure 21:
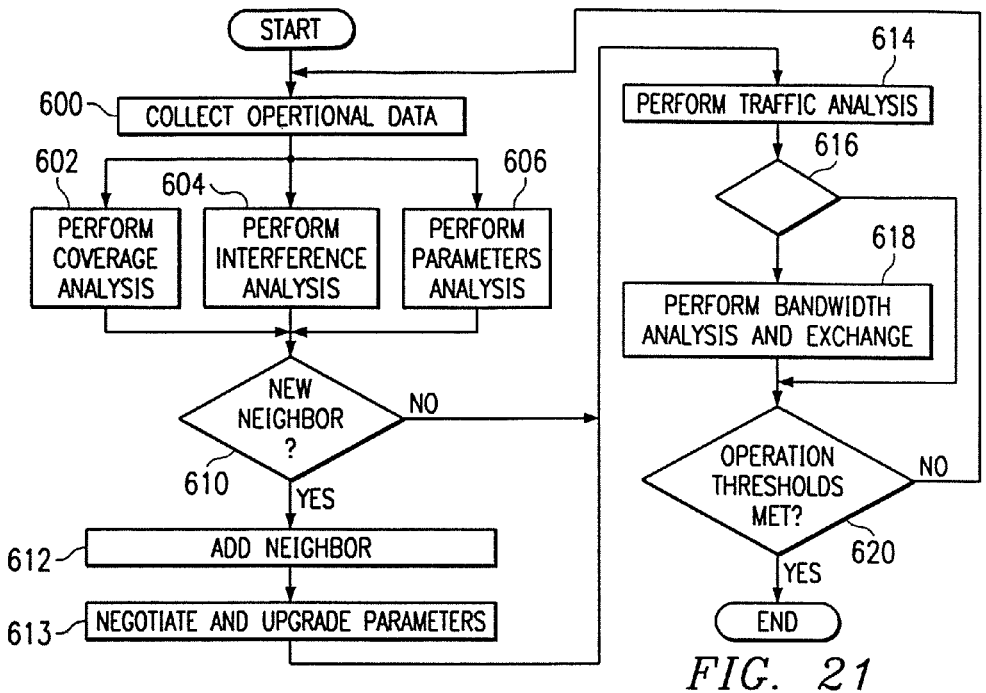
FIG. 21 is a flow diagram illustrating a methodology for the learning state of FIG. 7 in accordance with one embodiment of the present invention.

FIG. 21 is a flow diagram illustrating methodology for the learning state 222 in accordance with one embodiment of the present invention. In this embodiment, the wireless router 30 may handle only a partial load of traffic during the learning state 222. This allows the wireless router 30 to devote maximum resources to analyze operational data and refining operation of the router 30.

Referring to FIG. 21 the method begins at step 600 in which operational data is continuously collected by the wireless router 30. Based on the operational data, the wireless router 30 performs coverage analysis at step 602, interference analysis at step 604, and parameter analysis at step 606. The coverage, interference, and parameter analysis may be performed serially or in parallel and on a continuous, periodic, or other suitable basis, such as in response to an associated event. The coverage analysis is performed using real time statistics such as handoff requests and signal strength measurements to identify missing neighbors and coverage sufficiency. The interference analysis identifies excessive interference and missing co-channel neighbors. The parameter analysis uses access failures, call drops and handoff data to optimize the timing, access and handoff parameters.

Proceeding to decisional step 610, if a new neighbor is identified by the coverage, interference and/or parameter analysis, the Yes branch leads to step 612 at which the neighbor list and coverage parameters are updated based on the new neighbor. At step 613, parameters are renegotiated and updated with the existing routers to account for the added neighbor. If no resolution can be reached between the routers, the matter is referred to a OAM server for resolution as previously described. The OAM server will evaluate the site interference and other parameters provided to it and determine the optimum or other suitable parameters for the sites in conflict. If no new neighbor is identified, the No branch of decisional step 610 as well as step 613 lead to step 614.

At step 614, traffic analysis is performed to identify traffic overflow and/or bandwidth deficiencies. Next, at decisional step 616, if insufficient bandwidth is allocated, the Yes branch leads to step 618 in which bandwidth exchange and analysis is performed to obtain the needed bandwidth. If sufficient bandwidth is already available, the No branch of decisional step 616 as well as step 618 lead to decisional step 620. At decisional step 620, the wireless router determines whether the operational thresholds are met. If the operational thresholds have not been met for the specified period of time, then the wireless router 30 parameters are not optimized and the No branch returns to step 600 in which additional data is collected and analyzed as previously described. Upon the operational thresholds being met for the specified period of time, the wireless router is considered to be optimally configured and the Yes branch of decisional step of 620 leads to the end of the learning process.

Figure 22:
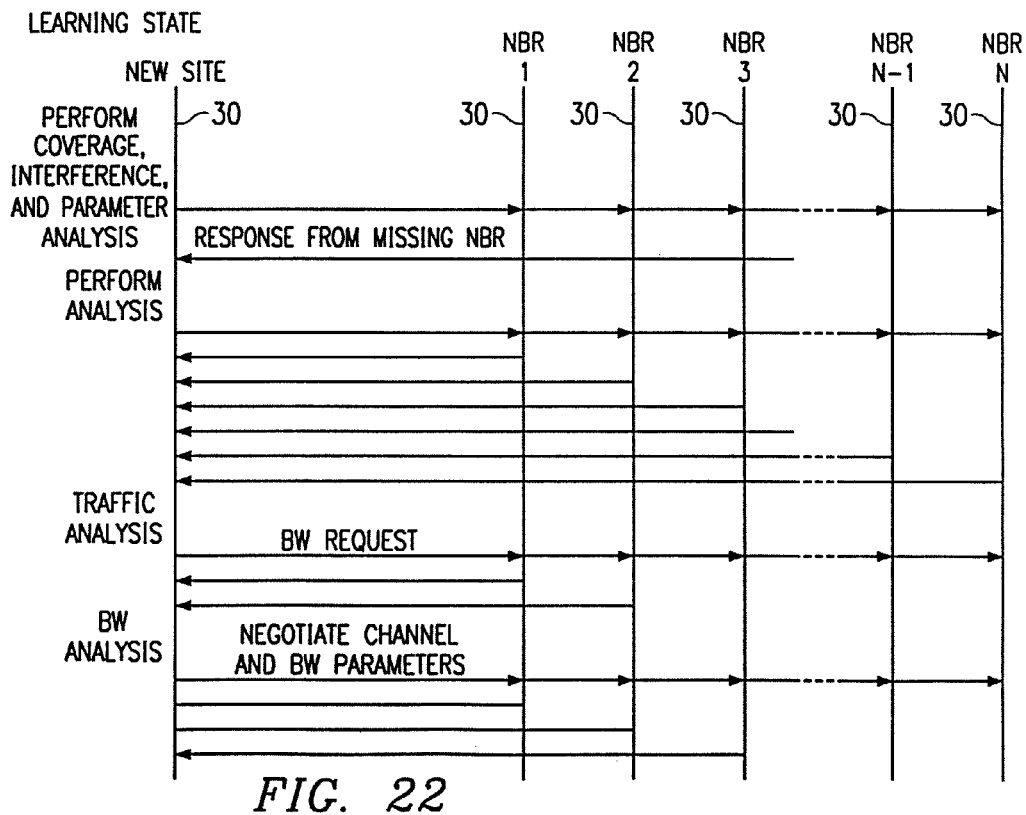
FIG. 22 is a call flow diagram for the learning state of in FIG. 7 accordance with one embodiment of the present invention.

FIG. 22 is a call flow diagram for the learning state 222 in accordance with one embodiment of the present invention. In this embodiment, a wireless router 30 communicates with neighbors in its limited operation. The wireless router 30 may receive responses from a missing neighbor and update its parameters based on the addition of that neighbor. Coverage, interference, and parameter analysis are performed on statistical information collected from communication with the neighboring sites and modified parameters are negotiated. Traffic analysis is also performed and bandwidth requested from the neighboring sites if needed by the new site. Channel and bandwidth parameters may be negotiated between sites.

Figure 23:
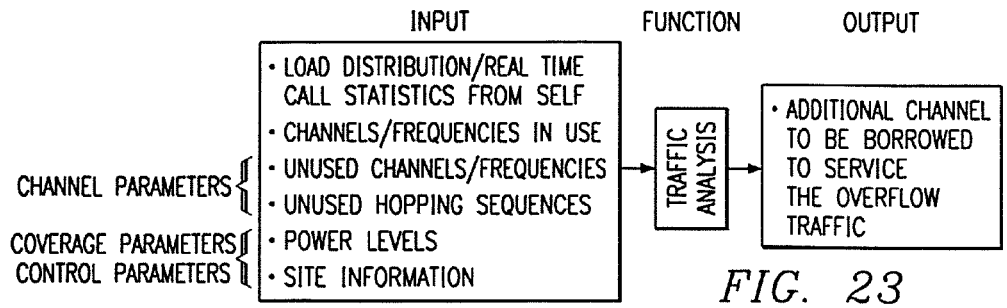
FIG. 23 is a block diagram illustrating the traffic analysis function of FIG. 21 in accordance with one embodiment of the present invention.

FIG. 23 illustrates the traffic analysis function of FIG. 21 in accordance with one embodiment of the present invention. In this embodiment, the traffic analysis function analyzes load distribution, channels and frequencies in use, unused channels/frequencies, unused hopping sequences, power levels, site information, coverage parameters and control parameters as well as real time call statistics collected by the activated site. Based on the input parameters, the traffic analysis function determines whether and what type of channels need to be borrowed to serve any traffic overflow.

Figure 24:
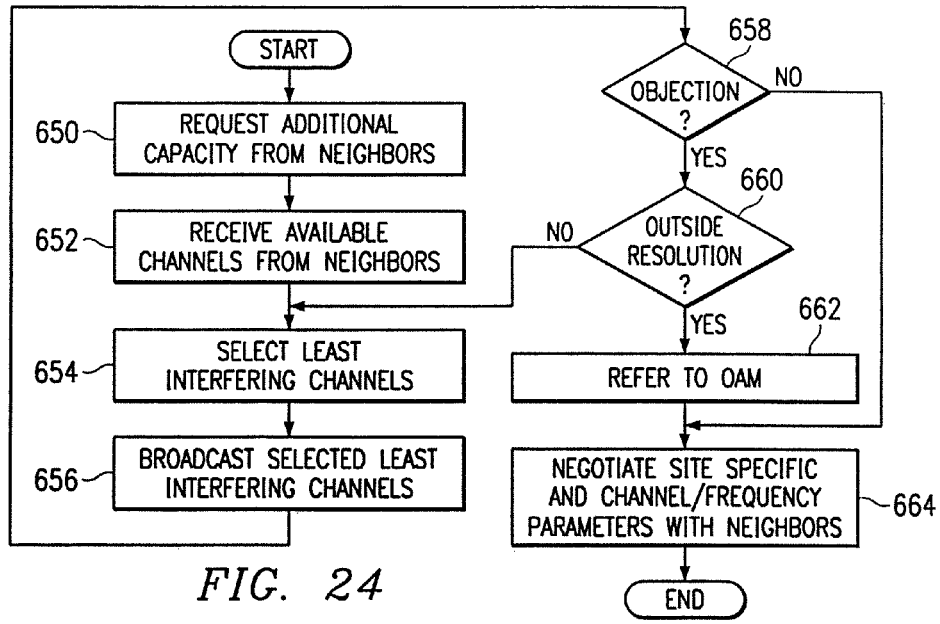
FIG. 24 is a flow diagram illustrating a method for performing the bandwidth analysis and exchange function of FIG. 21 in accordance with one embodiment of the present invention.

FIG. 24 is a flow diagram illustrating a method for performing the bandwidth analysis and exchange function in accordance with one embodiment of the present invention. In this embodiment, the method begins at step 650 in which additional bandwidth capacity is requested from neighboring wireless routers. At step 652, the neighbors perform traffic analysis and respond with unused channels available for borrowing.

Next, at step 654, the site analyzes the responses from the neighbors and selects channels that cause the least interference within the system. At step 656, the selected channels are broadcasts to regional wireless routers 30 to allow neighbors to object to the use of those channels. If a neighboring wireless router 30 objects to the use of the those channels, the Yes branch of decisional step 658 leads to decisional step 660 in which it is determined if outside resolution is necessary. Outside resolution may be necessary after no agreement has been reached after a specified number of negotiations or a specified period of time. If outside resolution is not necessary, the No branch of decisional step 660 returns to step 654 in which the next set of least, or minimum, interfering channels is reselected based on new information provided by the responding wireless router 30. If outside resolution is necessary, the Yes branch of decisional step 660 leads to step 662 in which the matter is referred to a OAM server. After all objections have been taken into account or the matter resolved by an OAM server, the Yes branch of decisional step 658 as well as step 662 lead to step 664. At step 664, the new channel/frequencies and the site parameters are negotiated with the neighboring wireless routers 30. If agreement cannot be reached on the parameters, the matter may be referred to the OAM server as previously described. Step 664 leads to the end of the process by which the wireless routers 30 communicate among themselves to exchange bandwidth as needed within the network.

Figure 25:
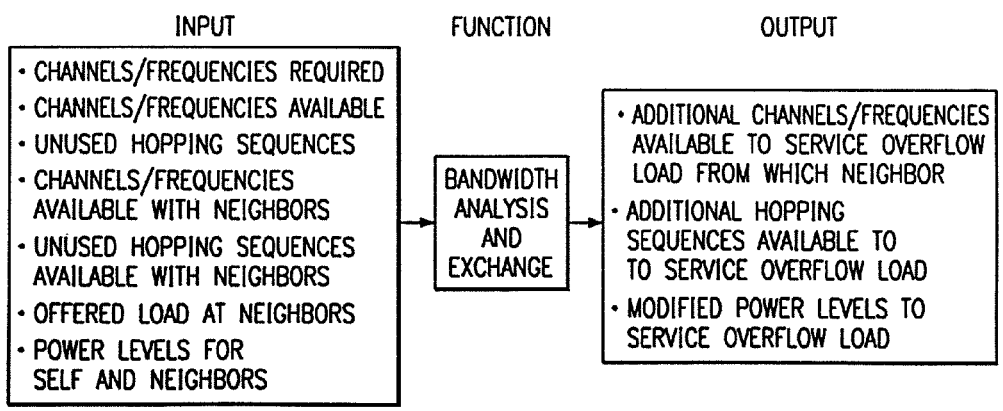
FIG. 25 is a block diagram illustrating the bandwidth analysis and exchange function of FIG. 21 in accordance with one embodiment of the present invention.

FIG. 25 illustrates the bandwidth analysis and exchange function in accordance with one embodiment of the present invention. In this embodiment, the bandwidth analysis and exchange function analyzes channels/frequencies required, channels/frequencies available, unused hopping sequences, channel/frequencies available with neighbors, unused hopping sequence available with neighbors, offered load to neighbors and power levels for the site and neighboring sites. Based on these input parameters, the bandwidth analysis and exchange function determines additional channels/frequencies available to service overflow load from particular neighbors, additional hopping sequences available to service the overflow load, and modified power levels to service the overflow load. It will be understood that the bandwidth analysis and exchange function and the other functions may analyze additional input parameters and/or generate additional output parameters without departing from the scope of the present invention.

Figure 26:
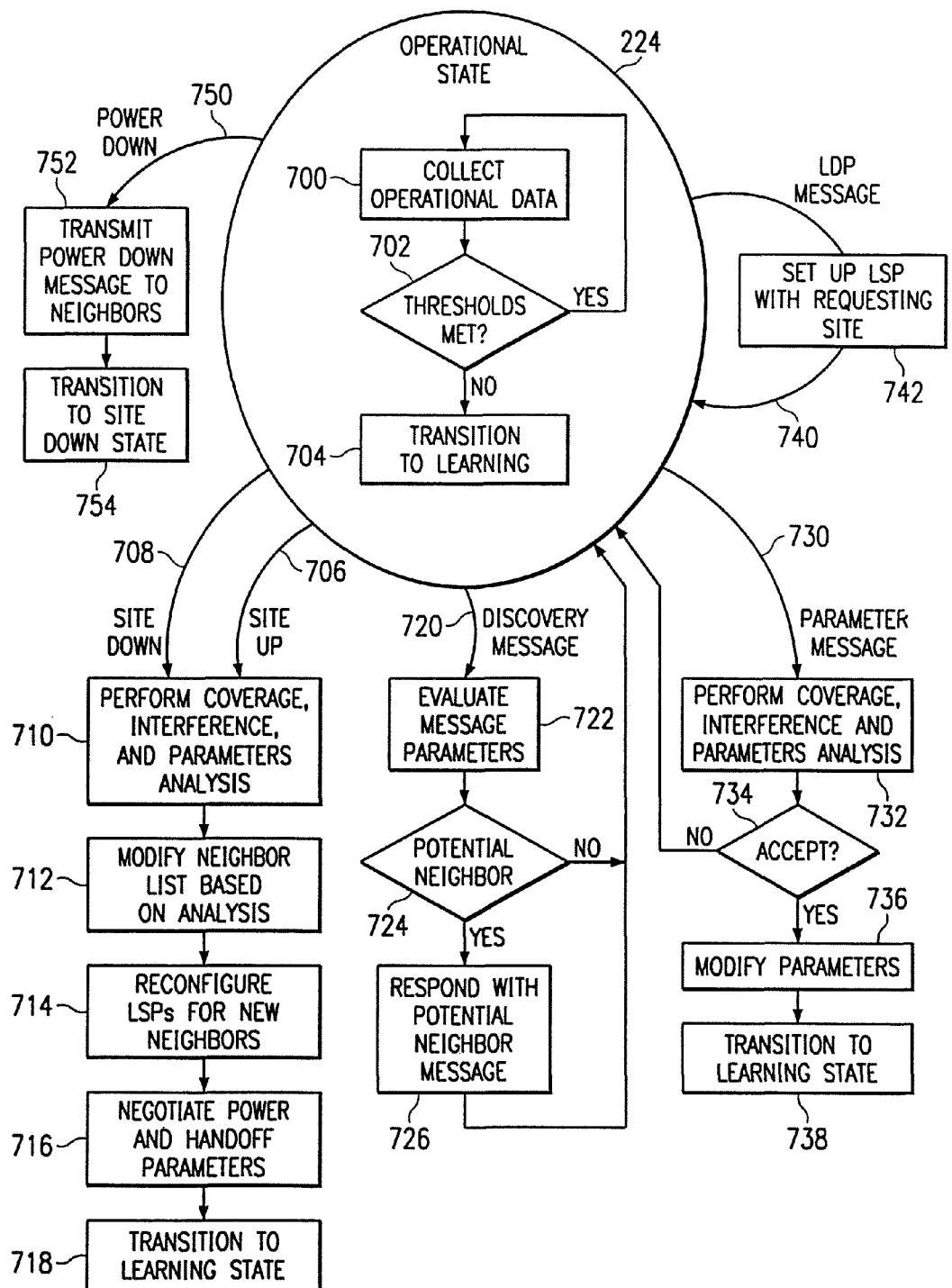
FIG. 26 is a flow diagram illustrating a methodology for the operational state of FIG. 7 in accordance with one embodiment of the present invention.

FIG. 26 is a flow diagram illustrating methodology of the operational state 224 in accordance with the present invention. In this embodiment, the operational state continuously collects operational data at step 700 and determines whether operation thresholds are met at decisional step 702. If threshold parameters are met, the Yes branch of decisional step 702 returns to step 700 in which additional operational data is collected for further analysis. If operational thresholds are not met, the No branch of decisional step 702 leads to step 704 in which the wireless router 30 transitions back to the learning state 222.

In response to a neighboring site up message 706 and/or a neighboring site down message 708, the wireless router 30 performs coverage, interference and parameter analysis at step 710. Based on the analysis the neighbor list is modified at step 712. LSPs are reconfigured for the new neighbors at step 714 and power levels renegotiated at step 716. Next, at step 718, the wireless router 30 transitions back to the learning state 222 for operational evaluation of the new parameters.

In response to a new discovery message 720, the wireless router 30 evaluates included parameters at step 722. At decisional step 724, the wireless router 30 determines whether it is a potential neighbor based on the location of the transmitting site, technologies employed by the site, and other suitable criteria. If the wireless router 30 is not a potential neighbor, the No branch returns back to the operational state 224 without further analysis. If the wireless router 30 is a potential neighbor, the Yes branch of decisional step 724 leads to step 726. At step 726, the wireless router 30 generates a potential neighbor message with detailed site impact parameters and responds to the requesting site. Step 726 also returns back to the operational state 224.

In response to a change parameter message 730 from a neighboring site, the wireless router performs coverage, interference and parameter analysis at step 732. At decisional step 734, the wireless router 30 determines whether to accept the requested parameter change based on the analysis. If the request would cause an unacceptable level of interference or reduction in coverage area for the wireless router 30, the parameter change is not accepted and the No branch of decisional step 734 returns to the operational state 224. If the proposed parameter change is acceptable, the Yes branch of decisional step 734 leads to step 736 in which the wireless router 30 is modified based on the accepted parameter. At step 738, the wireless router 30 transitions to the learning state 222 for evaluation of operations with the new parameter.

In response to an LDP/RSVP message 740, the wireless router 30 sets up an LSP with the requesting site at step 742 and then returns to the operational state 224. Upon controlled power down 750, the wireless router 30 transmits a power down message to its neighbors at step 752. The power down message may include site impact parameters for analysis/use by the neighbor sites. The power down message will alert the neighbors to the change in status of the wireless router 30 and allow the neighboring routers to reconfigure themselves by analyzing the site impact parameters to changes in the network. After transmission of the power down message, the wireless router 30 transitions to the power down state 226.

Figure 27:
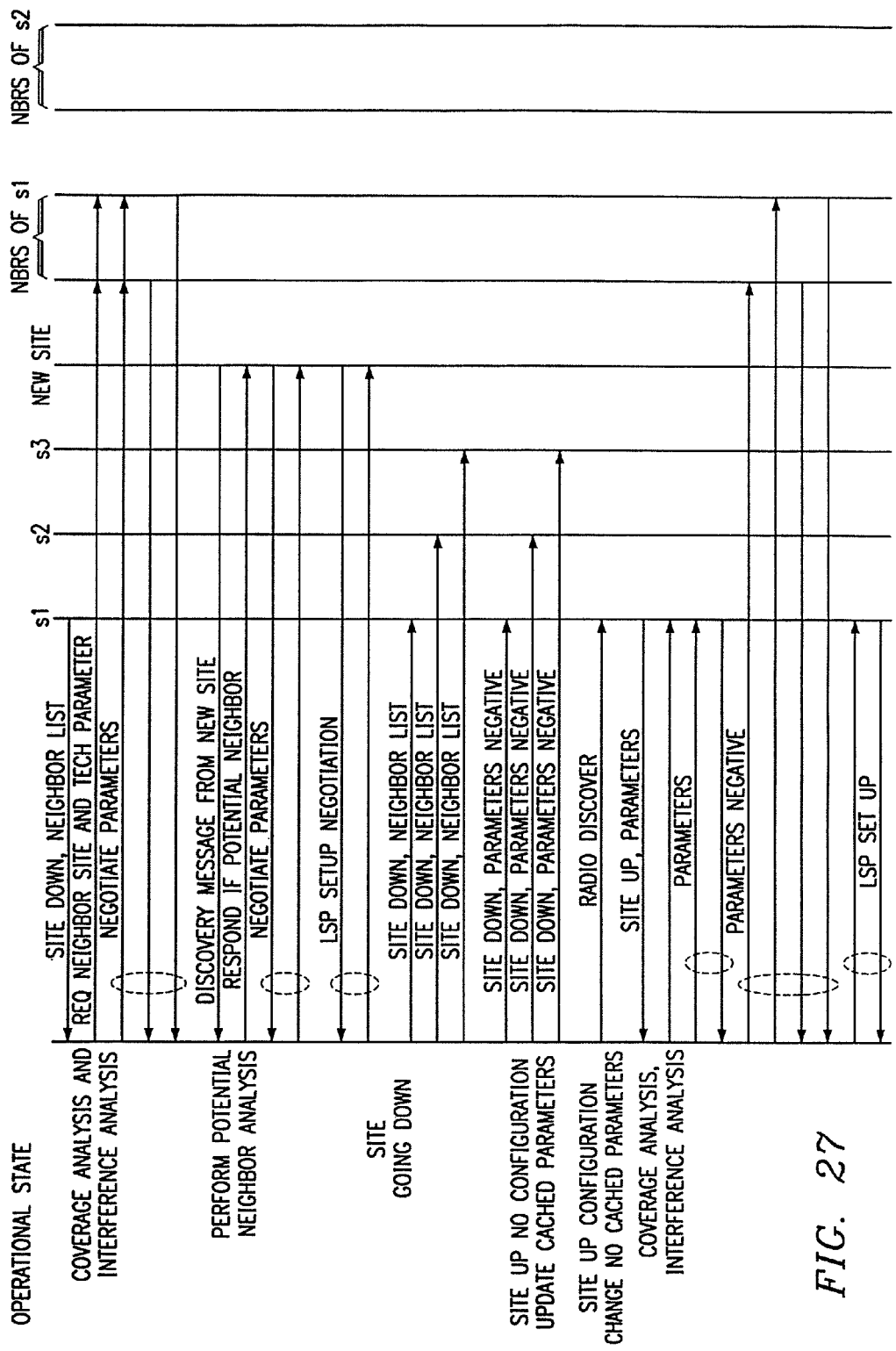
FIG. 27 is a call flow diagram for the operational state of FIG. 26 in accordance with one embodiment of the present invention.

FIG. 27 illustrates a call flow for the operational state 224 in accordance with one embodiment of the present invention. In this embodiment, the wireless router 30 includes sectors S1-3 and performs coverage, interference and parameter analysis based on statistical data. The wireless router 30 performs potential neighbor analysis and responds to discovery messages from new sites that are potential neighbors. Thereafter it may negotiate parameters and set up LSPs with the new neighbor. The wireless router 30 determines whether any of the sectors S1-S3 are affected by a site going up or going down. In response to a configuration change from a neighbor modification, the wireless router 30 may negotiate parameters and set up LSPs with new and/or different neighbors.

Although the present invention has been described with several embodiments, various changes and modifications may be suggested to one skilled in the art. It is intended that the present invention encompass such changes and modifications as fall within the scope of the appended claims.

What is claimed is:

1. A method for providing connectivity between mobile devices and an Internet protocol (IP) network, comprising:
    providing a set of neighboring wireless routers, each operable to receive data packets from a mobile device and to route the data packets to the IP network;
    providing connectivity between the set of neighboring wireless routers through a set of wireline routers in the IP network;
    exchanging impact information between the neighboring wireless routers to adjust operating parameters of the wireless routers in response to variations in the wireless network;
    wherein the impact information comprises traffic engineering parameters for the wireless router;

wherein the traffic engineering parameters comprise at least one of a class-of-service algorithm and a class-of-service resource allocation or a quality-of-service algorithm and a quality-of-service resource allocation; and wherein adjusting operating parameters of the wireless routers comprises determining, based on the exchanged impact information, operating parameters such that traffic engineering parameters are negotiated among the set of neighboring routers.

2. The method of claim 1, wherein the impact information further comprises interference impact information.

3. The method of claim 1, wherein the impact information further comprises site impact information.

4. The method of claim 3, wherein the site impact information comprises a plurality of geographic parameters, network configuration parameters, service configuration parameters, and antenna parameters.

5. The method of claim 3, wherein the site impact information for the wireless router comprises a plurality of coverage, spectrum, channel, interference, control, and threshold parameters for the wireless router.

6. The method of claim 1, further comprising in response to one of the set of neighboring wireless routers being deactivated, exchanging impact information between the remaining wireless routers in the set and adjusting operating parameters in the remaining wireless routers to account for the absence of the deactivated wireless router.

7. The method of claim 1, further comprising in response to activation of a new neighboring wireless router, exchanging impact information between the neighboring wireless routers and adjusting operating parameters in the neighboring wireless routers to account for addition of the new neighboring wireless router.

8. The method of claim 1, further comprising exchanging impact information and adjusting operating parameters between the neighboring wireless routers in response to a configuration change in the set of neighboring wireless routers.

9. A method for providing connectivity between mobile devices and an Internet protocol (IP) network, comprising:
    receiving at a wireless router data packets from a mobile device;
    routing the data packets to the IP network;
    connecting to at least one neighboring wireless router of a set of neighboring wireless routers through at least one wireline router of a set of wireline routers in the IP network;
    exchanging impact information with the at least one neighboring wireless router to adjust operating parameters of the wireless router in response to variations in the wireless network;
    wherein the impact information comprises traffic engineering parameters for the wireless router;
    wherein the traffic engineering parameters comprise at least one of a class-of-service algorithm and a class-of-service resource allocation or a quality-of-service algorithm and a quality-of-service resource allocation; and
    wherein adjusting operating parameters of the wireless routers comprises determining, based on the exchanged impact information, operating parameters such that traffic engineering parameters are negotiated among the set of neighboring routers.

10. The method of claim 9, wherein the impact information further comprises interference impact information.

11. The method of claim 9, wherein the impact information further comprises site impact information.

12. The method of claim 11, wherein the site impact information comprises a plurality of geographic parameters, network configuration parameters, service configuration parameters, and antenna parameters.

13. The method of claim 11, wherein the site impact information for the wireless router comprises a plurality of coverage, spectrum, channel, interference, control, and threshold parameters for the wireless router.

14. The method of claim 9, further comprising in response to the at least one neighboring wireless router being deactivated, exchanging impact information between the remaining wireless routers in the set and adjusting operating parameters of the wireless router to account for the absence of the deactivated at least one wireless router.

15. The method of claim 9, further comprising in response to activation of a new neighboring wireless router, exchanging impact information with the at least one neighboring wireless router and adjusting operating parameters of the wireless router to account for addition of the new neighboring wireless router.

16. The method of claim 9, further comprising exchanging impact information with the at least one neighboring wireless router and adjusting operating parameters of the wireless router in response to a configuration change in the set of neighboring wireless routers.

17. A wireless node for a wireless communications network, comprising:
    computer implementable instructions encoded in at least one computer processable non-transitory medium;
    the instructions operable upon processing to receive at a wireless router data packets from a mobile device, to route the data packets to the IP network, to connect to at least one neighboring wireless router of a set of neighboring wireless routers through at least one wireline router of a set of wireline routers in the IP network;
    the instructions operable upon processing to exchange impact information with the at least one neighboring wireless router to adjust operating parameters of the wireless router in response to variations in the wireless network;
    wherein the impact information comprises traffic engineering parameters for the wireless router;
    wherein the traffic engineering parameters comprise at least one of a class-of-service algorithm and a class-of-service resource allocation or a quality-of-service algorithm and a quality-of-service resource allocation; and
    wherein adjusting operating parameters of the wireless routers comprises determining, based on the exchanged impact information, operating parameters such that traffic engineering parameters are negotiated among the set of neighboring routers.

18. The node of claim 17, wherein the impact information further comprises interference impact information.

19. The node of claim 17, wherein the impact information further comprises site impact information.

20. The node of claim 19, wherein the site impact information comprises a plurality of geographic parameters, network configuration parameters, service configuration parameters, and antenna parameters.

21. The node of claim 19, wherein the site impact information for the wireless node comprises a plurality of coverage, spectrum, channel, interference, control, and threshold parameters for the wireless node.

22. The node of claim 17, wherein the instructions are further operable upon processing to, in response to the at least one neighboring wireless router being deactivated, exchange impact information between the remaining wireless routers in the set and adjust operating parameters of the wireless router to account for the absence of the deactivated at least one wireless router.

23. The node of claim 17, wherein the instructions are further operable upon processing to, in response to activation of a new neighboring wireless router, exchange impact information with the at least one neighboring wireless router and adjust operating parameters of the wireless router to account for addition of the new neighboring wireless router.

24. The node of claim 17, wherein the instructions are further operable upon processing to exchange impact information with the at least one neighboring wireless router and adjust operating parameters of the wireless router in response to a configuration change in the set of neighboring wireless routers.

\* \* \* \* \*